(12) United States Patent
Ukai et al.

(10) Patent No.: US 7,419,518 B2
(45) Date of Patent: Sep. 2, 2008

(54) HYDROGEN GENERATOR AND FUEL CELL SYSTEM

(75) Inventors: Kunihiro Ukai, Ikoma (JP); Kiyoshi Taguchi, Osaka (JP); Hidenobu Wakita, Yawata (JP); Seiji Fujihara, Amagasaki (JP); Yukimune Kani, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 494 days.

(21) Appl. No.: 11/039,082

(22) Filed: Jan. 21, 2005

(65) Prior Publication Data

US 2006/0083956 A1    Apr. 20, 2006

(30) Foreign Application Priority Data

Jan. 22, 2004    (JP) .............................. 2004-014751

(51) Int. Cl.
  *B01J 8/00*    (2006.01)
  *B01J 7/00*    (2006.01)
  *C01B 3/36*    (2006.01)
  *F01N 3/20*    (2006.01)
  *H01M 8/00*    (2006.01)

(52) U.S. Cl. .................... 48/127.9; 48/61; 48/197 R; 48/198.7; 422/105; 422/198; 429/12; 429/20

(58) Field of Classification Search ............. 48/127.9; 422/105, 198; 429/20
  See application file for complete search history.

(56) References Cited

U.S. PATENT DOCUMENTS 6,562,088 B2    5/2003    Ukai et al.

2002/0071975 A1    6/2002    Shimazu
2002/0150800 A1*   10/2002   Asou et al. .................. 429/20
2004/0037761 A1    2/2004    Maenishi

FOREIGN PATENT DOCUMENTS

| EP | 1 271 679 | 1/2003 |
|---|---|---|
| EP | 1 501 147 | 1/2005 |
| EP | 1 538 126 | 6/2005 |
| JP | 2000095504 | 4/2000 |
| JP | 2000290001 | 10/2000 |
| JP | 1 094 031 | 4/2001 |
| JP | 2002008701 | 1/2002 |
| JP | 2002093447 | 3/2002 |
| JP | 2002151124 | 5/2002 |
| WO | 02/090249 | 11/2002 |

* cited by examiner

*Primary Examiner*—Walter D. Griffin
*Assistant Examiner*—Lessanework T Seifu
(74) *Attorney, Agent, or Firm*—Dickinson Wright, PLLC

(57) ABSTRACT

In a hydrogen generator according to the invention, a reformer temperature sensor detects the temperature of a reformer at a start of a stop operation of a hydrogen generator. In a controller, a processing and controlling portion compares the detected temperature with first to fourth reference temperatures pre-stored in a storage portion, and determines which of the following conditions is the temperature condition of the hydrogen generator at the stop; a first condition in which water condensation occurs, a second condition in which water condensation and carbon deposition are avoidable, a third condition in which carbon deposition occurs, a fourth condition in which disproportionation reaction occurs, and a fifth condition in which oxidization of catalyst occurs. According to the determination result, an appropriate setting is selected among first to fifth replacement settings pre-stored in the controller corresponding to the first to fifth conditions, and an internal gas replacement operation is performed according to the selected setting.

34 Claims, 13 Drawing Sheets

HYDROGEN GENERATOR AND FUEL CELL SYSTEM

BACKGROUND OF THE INVENTION

1. Field of the Invention

The present invention relates to a hydrogen generator configured to generate hydrogen-rich gas by steam-reforming a material at least containing carbon atoms and hydrogen atoms, and to a fuel cell system configured to generate electricity and heat using the hydrogen-rich gas.

2. Description of the Related Art

At present, a hydrogen gas supply system has not yet been developed as a general infrastructure. For this reason, some fuel cell systems, which have been developed and commercialized as a distributed power generation hydrogen generator, have a configuration in which a hydrogen gas generating means is provided along with a fuel cell, so that hydrogen gas, which serves as an electric-power generating fuel, generated by the hydrogen gas generating means is supplied to the fuel cell instead of directly supplying hydrogen gas to the hydrogen generator. For example, there is a fuel cell system in which a hydrogen generator configured to generate hydrogen using a material supplied from an existing infrastructure, such as city gas and LPG, is additionally provided.

Many of hydrogen generators generate hydrogen gas by causing a material such as city gas or LPG to undergo a chemical reaction (specifically, steam reforming) using a catalyst. With such hydrogen generators, when the hydrogen generator is repeatedly operated and stopped, the oxidization and reduction of the catalyst is more likely to be repeated at high temperatures than when the hydrogen generator is continuously operated, increasing the possibility of degrading the catalytic activity. In particular, at the stopping of the hydrogen generator, the catalyst within the hydrogen generator is in a high temperature state, and the probability of air coming into the interior of the hydrogen generator is increased because the internal pressure of the hydrogen generator is reduced due to the temperature decrease associated with the stop operation. When the catalyst is placed under a high-temperature oxidizing atmosphere, the catalytic activity of the catalyst noticeably decreases due to sintering or the like.

In order to prevent the decrease in the catalytic activity caused by the stop of the hydrogen generator, it is desirable to replace the generated gas remaining in the hydrogen generator using an inert gas such as nitrogen as a replacement gas (hereinafter, this is referred to as "internal gas replacement operation"). Nevertheless, as with hydrogen gas, an infrastructure for the inert gas has not been developed either; for this reason, it is desired to prevent decrease in the catalytic activity by performing the internal gas replacement operation without using an inert gas. There is an example of such a hydrogen generator in which the supply of a material and water is stopped in a stop operation after the temperature of the catalyst has been reduced, thereby preventing the catalyst from oxidizing even when air enters the interior of the hydrogen generator (for example, Japanese Unexamined Patent Publication No. 2000-290001).

There is another configuration of a hydrogen generator in which, with the temperature of the reformer being configured to be detectable, the temperature of the reformer is detected at a stop of a hydrogen generator and also an internal gas replacement operation is performed with a feed gas when the detected temperature becomes less than a predetermined temperature, thus preventing the air from entering. By performing the internal gas replacement operation with a feed gas, such a configuration makes it possible to prevent decrease in the activity of the shift catalyst particularly due to steam and oxygen (for example, see Japanese Unexamined Patent Publication No. 2000-95504.) Further, there are types in which, during a stop operation of the hydrogen generator, a gas mixture of a material and steam is flowed in the hydrogen generator to cool the catalyst naturally and an internal gas replacement operation is performed with air after the cooling (cf. Japanese Unexamined Patent Publication Nos. 2002-8701 and 2002-93447), and in which the internal gas replacement operation is performed with a material (for example, cf. Japanese Unexamined Patent Publication No. 2002-151124).

It should be noted that temperature conditions of a hydrogen generator at the stop vary depending on the operating state of the hydrogen generator until the stop. Herein, the "stop" refers to a time point at which a control signal for stopping is output from a controller, and a "stop operation period" refers to a period from when this signal is output to when the hydrogen generator completely stops.

For example, temperature conditions of a hydrogen generator at the stop vary between when the hydrogen generator is stopped after a long time operation and when the hydrogen generator is immediately stopped after the start-up. In addition, even when the hydrogen generator is stopped immediately after the starting of the hydrogen generator, there exist a state in which the interior of the hydrogen generator has not yet been heated sufficiently and a state in which it has been heated to a certain degree, depending on the state of the hydrogen generator before the start-up. For example, when the hydrogen generator having been stopped for a long time so that the temperature dropped to room temperature is started to operate and the hydrogen generator is stopped immediately thereafter, the interior of the hydrogen generator has not been heated sufficiently; on the other hand, when the hydrogen generator having been operated for a long time and kept at a high temperature is temporarily stopped, then restarted immediately thereafter, and stopped again, the interior of the hydrogen generator is in a heated condition to a certain degree in which the temperature is kept high.

As described above, temperature conditions of the hydrogen generator at the stop vary depending on the operation conditions that precede the stop, but the above-described conventional internal gas replacement operation is not necessarily adapted to such various temperature conditions of the hydrogen generators appropriately; moreover, failure to perform an appropriate replacement operation may cause the catalytic activity of the reforming catalyst to decrease. For example, the use of a gas that does not have an appropriate ratio of a material and water (steam) in the replacement operation may cause the catalyst to oxidize or cause the carbon in the material to deposit when the interior of the hydrogen generator is at a high temperature. On the other hand, if the interior of the hydrogen generator is at a low temperature, steam condenses inside the hydrogen generator, producing water. These also result in decrease in the catalytic activity of the reforming catalyst.

SUMMARY OF THE INVENTION

The present invention solves the foregoing and other problems, and it is an object of the invention to provide a hydrogen generator that prevents decrease in the catalytic activity associated with stopping of the hydrogen generator and is capable of performing good hydrogen production stably, and to provide a fuel cell system furnished with the hydrogen generator.

This and other objects are accomplished in accordance with the present invention by providing a hydrogen generator comprising: a hydrogen generating portion having a reformer configured to generate a hydrogen-rich reformed gas by causing a material containing an organic compound comprised of at least carbon and hydrogen to react with steam with the use of a catalyst: a heater configured to heat at least the reformer; a material supply portion configured to supply the material to the hydrogen generating portion; a water supply portion configured to supply water that is evaporated into the steam to the hydrogen generating portion; and a controller configured to control at least the heater, the material supply portion, and the water supply portion; the hydrogen generator being configured to stop heating in the heater at a start of a stop operation, and to perform an internal gas replacement operation to replace the hydrogen-rich gas within the hydrogen generator by a replacement gas in the stop operation by flowing the replacement gas through the hydrogen generator, wherein: in the internal gas replacement operation, the material supplied from the material supply portion, the steam generated from the water supplied from the water supply portion, air supplied from outside of the hydrogen generator, an inert gas supplied from outside of the hydrogen generator, or a gas mixture containing two or more of the material, the steam, the air, and the inert gas is used as the replacement gas; a composition of the replacement gas used according to a temperature condition of the hydrogen generator in the stop operation including at least the temperature of the reformer is pre-set in the controller; and in the stop operation, the controller determines the temperature condition of the hydrogen generator, and controls the heater, the material supply portion, and the water supply portion so as to perform the internal gas replacement operation using the replacement gas selected based on the determination and the pre-setting.

Such a configuration makes it possible to perform an internal gas replacement operation using an appropriate method according to the temperature condition of the hydrogen generator at a stop, specifically, using a replacement gas having an appropriate composition according to the temperature condition of the hydrogen generator. This makes it possible to perform the internal gas replacement operation quickly and effectively utilizing the replacement gas in an efficient manner while preventing deposition of carbon originating from a material or the like, and water condensation of steam within the hydrogen generator, and decrease in the catalytic activity resulting from high-temperature oxidation of catalyst, which are caused by inappropriate replacement gas compositions and high-temperature conditions.

The hydrogen generator may further comprises a reformer temperature sensor configured to detect the temperature of the reformer, and wherein the controller may determine, in the stop operation, the temperature condition of the hydrogen generator based on the temperature of the reformer detected by the reformer temperature sensor.

In the controller, at least one reference temperature may be pre-set, the reference temperature being a criterion for determining whether or not the reformer in the stop operation is in a condition in which water condensation of steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs; and at stop of an operation of the hydrogen generator, the temperature condition of the hydrogen generator may be determined by comparing the temperature of the reformer detected by the reformer temperature sensor with the reference temperature.

The hydrogen generator may further comprises a temperature sensor configured to detect a temperature of a predetermined portion other than the reformer, and the temperature condition of the hydrogen generator may be determined taking into account the temperature of the predetermined portion detected by the temperature sensor in the stop operation.

The hydrogen generator may further comprises: a shifter configured to remove carbon monoxide from a hydrogen-rich gas generated by the reformer through a shift reaction; a purifier configured to selectively oxidize a shifted gas obtained from the shifter to further remove carbon monoxide therefrom; a shifter temperature sensor configured to detect a temperature of the shifter; and a purifier temperature sensor configured to detect a temperature of the purifier; and wherein based on the temperature of the shifter detected by the shifter temperature sensor and the temperature of the purifier detected by the purifier temperature sensor in the stop operation, the controller may determine whether or not, in the stop operation, the shifter and the purifier are in a condition in which water condensation of steam occurs, and, based on the determination of the conditions of said shifter and said purifier and the determination of the temperature condition of said reformer, said controller determines the temperature condition of said hydrogen generator.

The controller may store an operating state of the hydrogen generator before the stop operation, and may estimate, in the stop operation, the temperature condition of the hydrogen generator in the stop operation from the stored operating state of the hydrogen generator.

The controller may pre-store a correlation between durations of running operation and temperature conditions of the hydrogen generator, and the controller may acquire a duration up to the start of the stop operation as the operating state of the hydrogen generator before the stop operation; and the controller may determine, from the acquired duration up to the start of the stop operation and based on the correlation pre-stored, whether or not the hydrogen generator in the stop operation is in a condition in which water condensation of the steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs.

In the controller, a first replacement gas setting may be stored such that, when the temperature condition of the hydrogen generator in the stop operation is the condition in which water condensation occurs, the internal gas replacement operation is performed using one of the replacement gases which are other than the replacement gas consisting of the steam.

In the controller, a second replacement gas setting may be stored such that, when the temperature condition of the hydrogen generator in the stop operation is the condition in which the water condensation and the thermal decomposition of the material are avoidable, the internal gas replacement operation is performed with the material, the steam, the air, the inert gas, or the gas mixture containing two or more of the material, the steam, the air, and the inert gas.

In the controller, a third replacement gas setting may be stored such that, when the temperature condition of the hydrogen generator in the stop operation is the condition in which thermal decomposition of the material occurs, the internal gas replacement operation is performed using one of the replacement gases which are other than the replacement gas consisting of the material.

In the controller, a fourth replacement gas setting may be stored such that, when the temperature condition of the hydrogen generator in the stop operation is the condition in which the disproportionation reaction occurs, the internal gas replacement operation is performed using the replacement gas containing the steam.

In the controller, a fifth replacement gas setting may be stored such that, when the temperature condition of the hydrogen generator in the stop operation is the condition in which oxidization of the catalyst occurs, the internal gas replacement operation is performed using one of the replacement gases which are other than the replacement gas consisting of the air.

In the controller, a first reference temperature, a second reference temperature, a third reference temperature, and a fourth reference temperature may be pre-set, the first reference temperature being a determination criterion as to whether or not the reformer is in a condition in which water condensation of the steam occurs, the second reference temperature being a determination criterion as to whether or not the reformer is in a condition in which thermal decomposition of the material occurs and being higher than the first reference temperature, the third reference temperature being a determination criterion as to whether or not the reformer is in a condition in which the disproportionation reaction occurs and being higher than the second reference temperature, and the fourth reference temperature being a determination criterion as to whether or not the reformer is in a condition in which oxidization of the catalyst occurs and being higher than the third temperature; and the hydrogen generator may perform the internal gas replacement operation in such a manner that: if the temperature of the reformer detected in the stop operation is less than the first reference temperature, the material is used as the replacement gas based on the first replacement gas setting; if the temperature of the reformer is equal to or higher than the first reference temperature and less than the second reference temperature, the material is used as the replacement gas based on the second replacement gas setting; if the temperature of the reformer is equal to or higher than the second reference temperature and less than the third reference temperature, the steam is used as the replacement gas based on the third replacement gas setting; if the temperature of the reformer is equal to or higher than the third reference temperature and less than the fourth reference temperature, a gas mixture that contains the material and the steam and has a S/C ratio, which is the ratio of water molecules S to carbon atoms C originating from the material, is 2 or greater, is used as the replacement gas based on the fourth replacement gas setting; and if the temperature of the reformer is equal to or higher than the fourth reference temperature, a gas mixture of the material and the steam supplied in the same supply amounts as those in a hydrogen generation operation is used as the replacement gas based on the fifth replacement gas setting.

In the controller, a first reference time, a second reference time, a third reference time, and a fourth reference time may be pre-set based on a correlation between the durations of the running operation and the temperatures of the reformer, the first reference time being a determination criterion as to whether or not the reformer being in the stop operation is in a condition in which water condensation of steam occurs, the second reference time being a determination criterion as to whether or not the reformer is in a condition in which thermal decomposition of the material occurs and being longer than the first reference time, the third reference time being a determination criterion as to whether or not the reformer is in a condition in which the disproportionation reaction occurs and being longer than the second reference time, and the fourth reference time being a determination criterion as to whether or not the reformer is in a condition in which the oxidization of the catalyst occurs and being longer than the third reference time; and the hydrogen generator may perform the internal gas replacement operation in such a manner that: if the duration of the operation is shorter than the first reference time, the material is used as the replacement gas based on the first replacement gas setting; if the duration of the operation is equal to or longer than the first reference time and shorter than the second reference time, the material is used as the replacement gas based on the second replacement gas setting; if the duration of the operation is equal to or longer than the second reference time and shorter than the third reference time, the steam is used as the replacement gas based on the third replacement gas setting; if the duration of the operation is equal to or longer than the third reference time and shorter than the fourth reference time, a gas mixture that contains the material and the steam and has a S/C ratio, which is the ratio of water molecules S to carbon atoms C originating from the material, is 2 or greater, is used as the replacement gas based on the fourth replacement gas setting; and if the duration of the operation is equal to or longer than the fourth reference time, a gas mixture of the material and the steam supplied in the same supply amounts as those in a hydrogen generation operation is used as the replacement gas based on the fifth replacement gas setting.

In the internal gas replacement operation during the stop operation, the controller may control the internal gas replacement operation according to a change in the temperature condition of the hydrogen generator associated with the stop operation. For example, the controller may determine the temperature condition of he hydrogen generator during the stop operation, and may select an appropriate setting of the replacement gas according to the determination.

A fuel cell system according to the present invention comprises a hydrogen generator having a configuration as described above, and a fuel cell configured to be supplied with a hydrogen-rich gas generated by the hydrogen generator as a material and with oxygen as an oxidizing agent, and to generate heat and electricity by oxidization of the hydrogen-rich gas.

Such a configuration makes it possible to supply a hydrogen-rich gas, which is a material, to the fuel cell stably since the hydrogen production is stably carried out in the hydrogen generator. Therefore, it becomes possible to realize a cogeneration system that is highly reliable and excellent in cost effectiveness and energy saving performance.

In another aspect, a hydrogen generator of the present invention comprises: a reformer configured to generate a hydrogen-rich reformed gas by reforming a material; a reformed gas passage configured to flow the reformed gas therethrough; a heater configured to heat the reformer by combusting a combustion fuel with mixing it with air; a combusted gas passage configured to flow a combusted gas generated by the combustion and separated from the reformed gas passage by a partition wall; and a reformer temperature sensor having a sheath tube on a surface of which an oxide film forms in an oxidizing atmosphere and a heat detecting element disposed in the sheath tube, the reformer temperature sensor configured to detect a temperature of the reformer by the heat detecting element, wherein the sheath tube of the reformer temperature sensor disposed in the vicinity of a surface of the partition wall which faces the combusted gas passage. Here, "in the vicinity of" means both of "in contact with" and "With having a space with respect to".

The partition wall may have a recessed portion that is recessed when viewed from the combusted gas passage side, and the sheath tube is accommodated in the recessed portion.

The foregoing and other objects, features and advantages of the present invention will become more readily apparent from the following detailed description of preferred embodiments of the invention, with reference to the accompanying drawings.

DETAILED DESCRIPTION OF THE INVENTION

Hereinbelow, preferred embodiments of the present invention are described with reference to the drawings.

Embodiment 1

Figure 1:
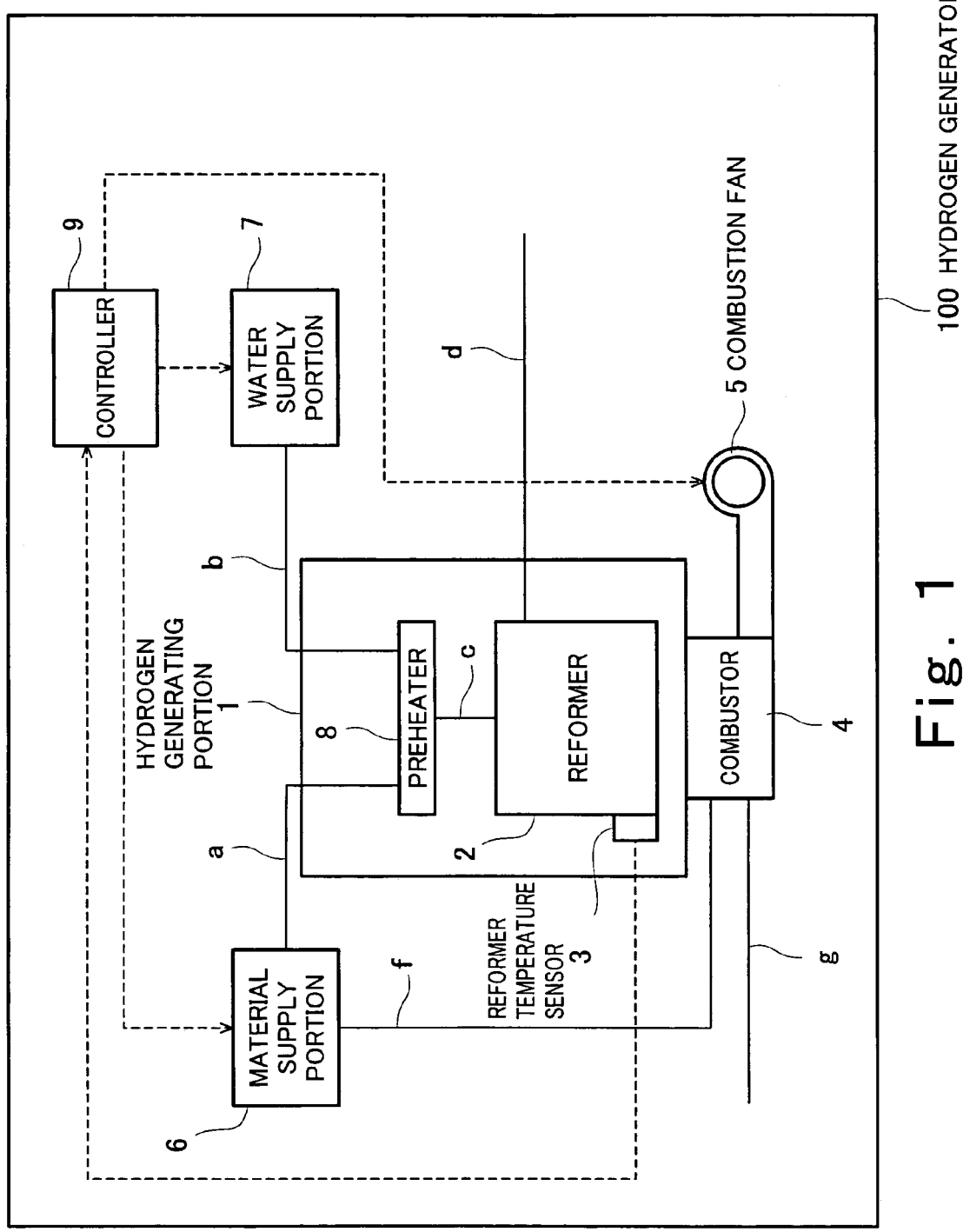
FIG. 1 is a schematic block diagram illustrating the configuration of a hydrogen generator according to Embodiment 1 of the present invention.
Figure 2:
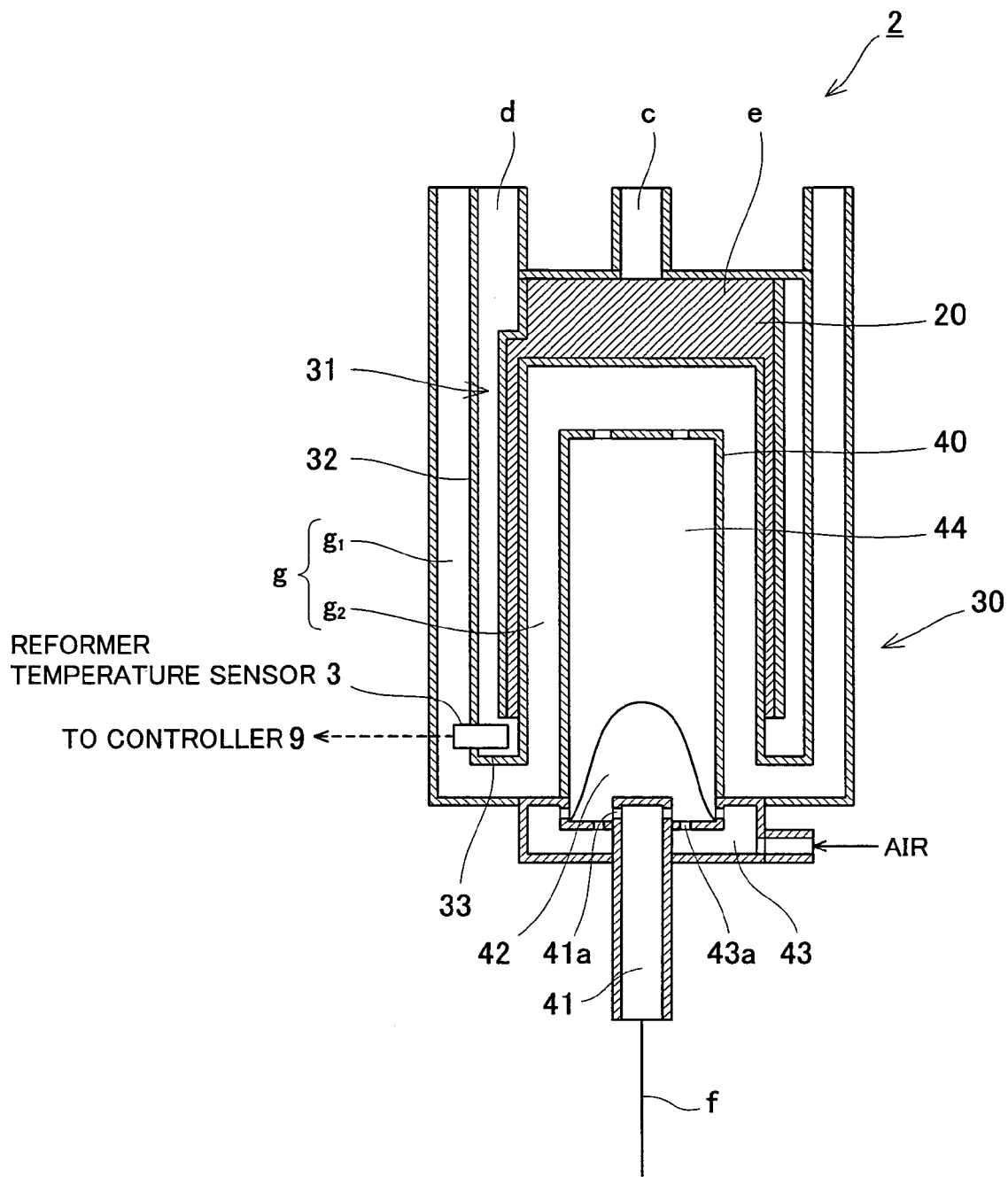
FIG. 2 is a schematic cross-sectional view illustrating the configuration of a primary portion of the reformer shown in FIG. 1.
Figure 3:
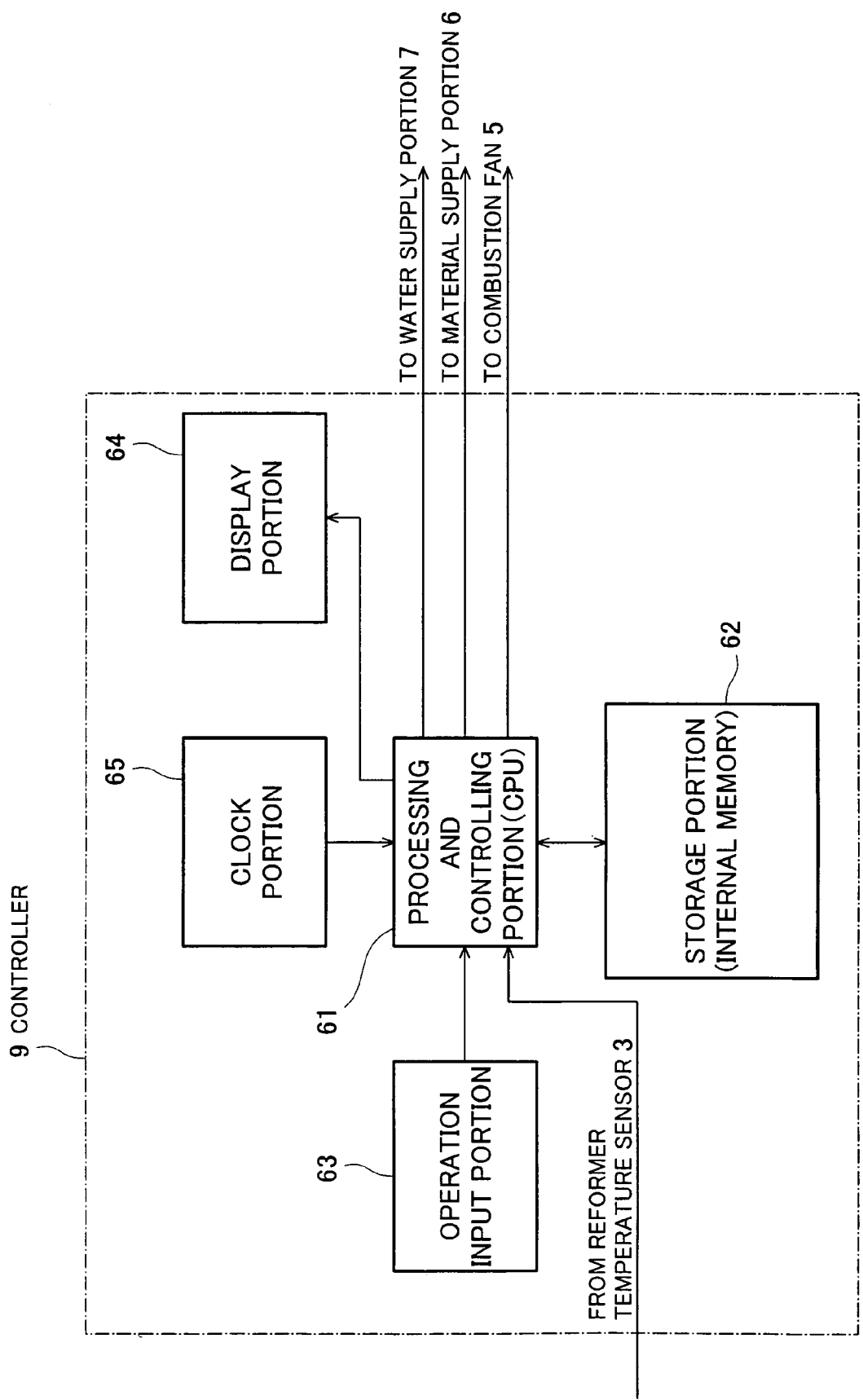
FIG. 3 is a block diagram showing the configuration of the controller shown in FIG. 1.

FIG. 1 is a block diagram schematically showing the configuration of a hydrogen generator according to Embodiment 1 of the invention. FIG. 2 is a cross-sectional view schematically showing the configuration of the reformer shown in FIG. 1. FIG. 3 is a block diagram schematically showing the configuration of the controller shown in FIG. 1.

As shown in FIG. 1, a hydrogen generator 100 comprises, as its main constitutional elements, a hydrogen generating portion 1 having a preheater 8 and a reformer 2, a material supply portion 6, a water supply portion 7, a combustor 4, and a controller 9.

The material supply portion 6 is connected to a preheater 8 of the hydrogen generating portion 1 via a material passage a. The water supply portion 7 is connected to the preheater 8 of the hydrogen generating portion 1 via a water passage b. The preheater 8 is connected to the reformer 2 via a mixed-material passage c. Here, in the hydrogen generating portion 1, the reformer 2 is arranged upstream from the preheater 8 on the heat transfer path of the combustion heat so that the heat generated by combusting a combustion fuel in the combustor 4 is transferred to the reformer 2 and the preheater 8 in this order. A reformer temperature sensor 3 configured to measure the temperature of the reformer 2 is disposed at an appropriate location of the hydrogen generating portion 1. The combustor 4 is provided with a combustion fan 5 for supplying air and a combusted gas passage g for discharging combusted gas originating from the combustion. A combustion fuel passage f configured to supply, as a combustion fuel, a portion of the material supplied from the material supply portion 6 to the combustor 4 is also connected to the combustor 4. The controller 9 is configured so that it is capable of controlling the material supply portion 6, the water supply portion 7, the combustor 4, and the combustion fan 5 and the temperature information detected by the reformer temperature sensor 3 is transferred thereto. This controller 9 controls the starting-up, operating, and stopping of the hydrogen generator.

As shown in FIG. 2, the reformer 2 comprises a cylindrical main body 30. It should be noted that although not shown in the figure here, the outer wall of the main body 30 is covered by a heat insulator in order to prevent heat dissipation to outside since the temperature of the reformer 2 becomes high. In the interior of the main body 30, a plurality of cylindrical bodies having different diameters are arranged concentrically, whereby the internal space of the main body 30 is radially partitioned by each of the cylindrical bodies, forming a plurality of ring-shaped gaps 31 extending in an axial direction. Herein, the circumferential wall of a cylindrical body that radially partitions the interior of the main body 30 is referred to as a vertical wall 32. A disk-shaped, or annular disk-shaped, horizontal wall 33 that is arranged concentrically with the vertical wall 32 is arranged at a predetermined end of the vertical wall 32 along its axial direction.

The gap 31 thus formed by the vertical wall 32 and the horizontal wall 33 forms, from the outer periphery side toward the center along a radial direction in the interior of the main body 30, a downstream passage g1 of the double structure combusted gas passage g, a reformed gas passage d, a reforming catalyst accommodating portion e, and an upstream passage g2 of the combusted gas passage g.

The downstream passage g1 and the upstream passage g2 of the combusted gas passage g, which are formed along the main body's axial direction, are connected to each other at a bottom portion of the main body 30. The upstream passage g2 of the combusted gas passage g is formed along the upper face and the side face of a later-described radiant cylinder 40 of the combustor 4 and communicates with the interior of the cylinder via blow holes of the radiant cylinder 40; meanwhile, an end of the downstream passage g1 is formed so that combustion gas can be discharged to the outside of the reformer 2.

A reforming catalyst is filled into the reforming catalyst accommodating portion e, whereby a reforming catalyst layer 20 is formed. Herein, a catalyst prepared by causing an alumina carrier to carries a ruthenium catalyst thereon is used as the reforming catalyst. The reforming catalyst layer 20 is arranged along the upper face and the side face of the radiant cylinder 40 of the combustor 4 such that the upstream passage g2 of the combusted gas passage g intervenes therebetween. The center of the upper end of the reforming catalyst layer 20 faces the mixed-material passage c, which is connected to the preheater 8 (see FIG. 1), and the lower end thereof faces the reformed gas passage d. In addition, the reformer temperature sensor 3 is disposed at the upstream end of the reformed gas passage d, which serves as an introduction inlet of the reformed gas. Herein, the reformer temperature sensor 3 is provided with a thermocouple as a temperature sensor, and the thermocouple is arranged at a portion where the gas that passes through the reforming catalyst layer 20 gathers. It should be noted that the location of the reformer temperature sensor 3 is not limited thereto as long as it is at such a position and such an atmosphere that the temperature change of the reforming catalyst layer 20 can be gauged comparatively quickly. Herein, the temperature of the gas that has passed through the reforming catalyst layer 20 is defined as the temperature of the reformer 2, and the temperature detected by the reformer temperature sensor 3 is identified as the temperature condition of the reformer 2. Here, in the present invention (in the claims and the specification), the phrase "to detect a temperature" is meant to include both "to detect a temperature directly" and "to detect a temperature indirectly". To detect a temperature directly means to detect a physical quantity that is temperature; for example, this applies to the cases where the temperature of a certain subject of detection is detected by a thermocouple or a thermistor. On the other hand, to detect a temperature indirectly means to detect a time or a physical quantity other than temperature which is related to the temperature of the subject of detection; for example, this applies to the cases where the internal pressure of the reformer or the operation time of the reformer is detected.

The radiant cylinder 40 is inserted in the center of the main body 30 of the reformer 2 so as to be concentric with the vertical wall 32. The upper end of the radiant cylinder 40 is connected to the upstream passage g2 of the combusted gas passage g, and a burner 41 having a fuel blow hole 41a is disposed at the lower end of the radiant cylinder 40. The internal space of the radiant cylinder 40 forms a combustion space 44, in which a flame 42 is formed. An air passage 43 for the air sent from the combustion fan 5 (see FIG. 1) is formed so as to surround the burner 41, and this air passage 43 is communicated with the combustion space 44 through an air blow hole 43a. The burner 41 is connected to the material supply portion 6 (see FIG. 1) via a combustion fuel passage f. Thus, the combustor 4 is constituted by the radiant cylinder 40, the burner 41, the air passage 43, and air is supplied to the air passage 43 by a sirocco fan that is the combustion fan 5. The revolution speed of the sirocco fan is controlled by the controller 9, whereby the air supply amount to the combustor 4 is regulated. By combusting the combustion fuel in the combustor 4, the reformer 2 is heated, and herein, the heating amount is controlled by the controller 9 so that the temperature of the reformer 2 results in a temperature at which about 85% to 95% of a hydrocarbon-based material, such as methane, ethane, or propane, that is supplied as a material to the reformer 2 can be steam reformed, for example, about 650° C. to 700° C.

The material supply portion 6 (see FIG. 1) is configured to supply such a material as a hydrocarbon-based material, e.g., natural gas or LPG, a naphtha-based material, or an alcohol material, e.g., methanol, to the hydrogen generating portion 1 through the material passage a. Herein, the material supply portion 6 is configured to use as a material a natural gas containing a hydrocarbon-based organic compound (specifically, mainly methane) supplied from an existing infrastructure. Although not shown in the figure, the material supply portion 6 comprises a booster configured to increase the supply pressure of the material and a desulfurization portion configured to reduce the sulfur component in the material. The desulfurization portion is provided with, for example, a zeolite adsorbent that removes odorant components in the material.

The water supply portion 7 (see FIG. 1) comprises an ion exchanger and a plunger pump, although they are not shown in the figure. For example, supplied tap water is processed with the ion exchanger and thereafter pressurized with the plunger pump to supply it to the hydrogen generating portion 1.

As shown in FIG. 3, the controller 9 comprises a computer such as a microcomputer, and it is constituted by a processing and controlling portion (CPU) 61, a storage portion (internal memory) 62 made up of a semiconductor memory, an operation input portion 63, a display portion 64, and a clock portion 65. The controller 9 controls the supply amounts of material and water, the combustion amount in the combustor 4, the output power of the combustion fan 5, and the like by means of each of the processing portions 61 to 65. Particularly when stopping the hydrogen generator, the controller 9 identifies the temperature condition of the hydrogen generator based on the temperature of the reformer 2 detected by the reformer temperature sensor 3 at the stop of the hydrogen generator, and it adjusts the composition of the replacement gas by controlling the material supply portion 6 and the water supply portion 7 so as to perform an internal gas replacement operation according to the identified temperature condition of the hydrogen generator. The details of the internal gas replacement operation will be discussed later.

Next, the operations of the hydrogen generator will be described. The operations of the hydrogen generator are categorized into the following: a running operation performed during a period from when a control signal for starting is output to when a control signal for stopping is output, and a stop operation (a hydrogen generator stopping operation) performed during a period from when the control signal for stopping is output to when the hydrogen generator actually stops. In the running operation, a hydrogen generator start-up operation and a hydrogen generation operation are carried out, while in the stop operation, an internal gas replacement operation is carried out.

First, in the running operation of the hydrogen generator, a control signal for starting is output from the processing and controlling portion 61 of the controller 9 to start up the hydrogen generator. Specifically, a combustion fuel is supplied through the combustion fuel passage f to the burner 41 of the combustor 4 at a predetermined supply amount, and air is supplied from the combustion fan 5 into the combustion space 44 of the combustor 4 at a predetermined supply amount. Here, the air supply amount is set at 1.5 times the theoretical air amount necessary for the complete combustion of methane. Then, the combustion fuel and the air are caused to react with each other to form flame 42 in the combustion space 44, and the reformer 2 and the preheater 8 are heated by the combustion heat and the heat of the combusted gas. In heating, the temperature of the reformer 2 is detected at all times by the reformer temperature sensor 3, and the information about the detected temperature is transferred to the processing and controlling portion 61 of the controller 9. Herein, the operation in which the combustion in the combustor 4 is started and the reformer 2 and the preheater 8 are preheated is referred to as a "start-up operation."

After the reformer 2 and the preheater 8 have been heated to elevate the temperatures of the reformer 2 (more specifically, the reforming catalyst layer 20) and the preheater 8 as described above, a material and water are supplied to the preheater 8 from the material supply portion 6 and the water supply portion 7, respectively. The supplied water evaporates in the preheater 8 to form steam, and the steam is mixed with a material and supplied to the reformer 2 through the mixed-material passage c. In the reformer 2, the material is steam-reformed through a reforming reaction to generate a reformed gas, that is, a hydrogen-rich gas (hereafter simply referred to as a "hydrogen gas"). The generated hydrogen gas is taken out to the outside of the hydrogen generator through the reformed gas passage d. Herein, the operation in which a material and steam are supplied to the reformer 2 and a hydrogen gas is generated through a reforming reaction is referred to as a "hydrogen generation operation."

In the hydrogen generation operation, the controller 9 controls the heating amount of the combustor 4 to keep the detected temperature by the reformer temperature sensor 3 at about 650° C. so that about 85% to 95% of the material (specifically, methane) supplied to the reformer 2 is reformed. In addition, the ratio of water molecules and carbon atoms in the gas mixture of the material and the steam supplied to the reformer 2 (which is referred to as a "steam/carbon ratio" and denoted by "S/C") is set at 3, that is, S/C is set so that water molecules are present at 3 moles with respect to 1 mole of carbon atoms in the gas mixture supplied to the reformer 2. Accordingly, 3 moles of water is supplied here while the theoretical water amount with respect to 1 mole of methane is 2 moles. Such S/C is set as follows; the user inputs a desired value (3 herein) to the operation input portion 63 of the controller 9 while confirming it with the display portion 64, and the input value is stored in the storage portion 62 through the processing and controlling portion 61. In the running operation of the hydrogen generator, the processing and controlling portion 61 of the controller 9 identifies the temperature condition of the reformer 2 by acquiring the temperature of the reformer 2 using the reformer temperature sensor 3, and according to the temperature condition, it controls the supply amounts of material, water, and air, the combustion amount of the combustion fuel in the combustor 4, and so forth.

Next, the stop operation of the hydrogen generator is discussed. Herein, a time point at which a control signal for stopping is output is referred to as "at a start of the stop operation", and a period from the time at the start of the stop operation until the hydrogen generator actually stops is referred to as "a stop operation period".

As previously described as the problems of conventional technology, the reforming catalyst that constitutes the reforming catalyst layer 20 deteriorates in its catalytic activity when sintering or oxidization occurs due to the influence of temperature. Particularly in the hydrogen generator's stop operation period, the reforming catalyst undergoes high-temperature oxidization easily and therefore the catalytic activity tends to deteriorate. For example, in the stop operation period, the hydrogen generator has a high probability of air coming into the interior of the hydrogen generator from outside due to the contraction of the internal gas volume associated with the temperature decrease of the hydrogen generator, and therefore, the reforming catalyst tends to oxidize at a high temperature, increasing the tendency of the catalytic activity decrease.

Figure 4:
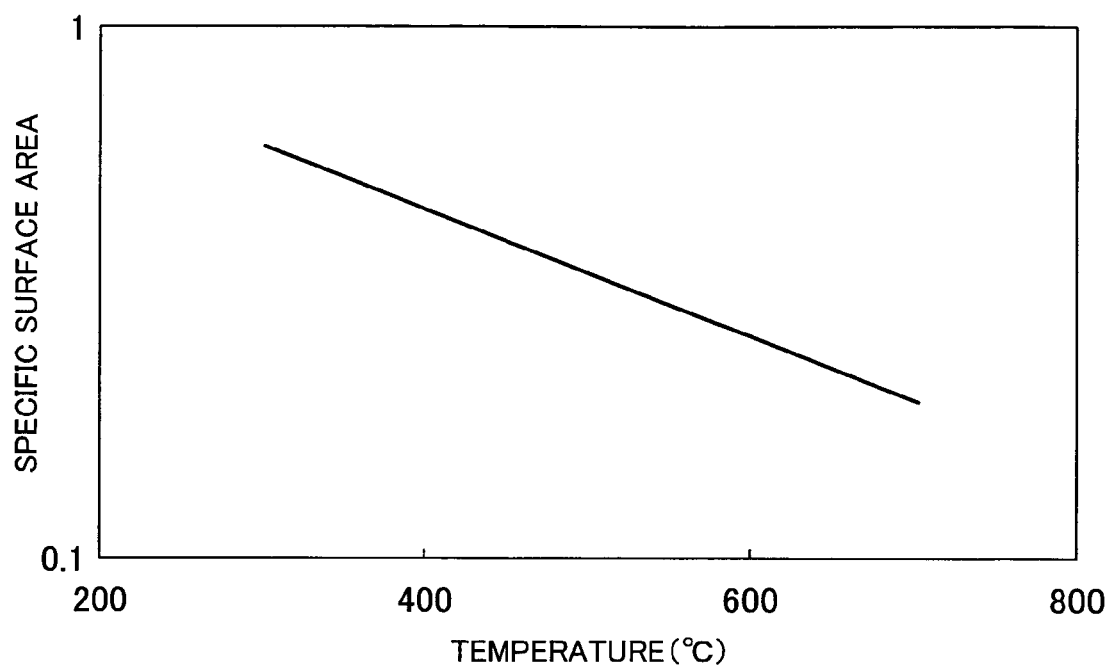
FIG. 4 is a graph illustrating the relationship between oxidization temperature and specific surface area of the Ru metal catalyst in the reformer.

FIG. 4 is a graph illustrating the relationship between oxidization temperatures of the reforming catalyst and specific surface area of the reforming catalyst. Here, the specific surface area of catalyst means a relative ratio of the surface area of Ru metal, which constitutes the reforming catalyst, that has not yet been oxidized with respect to the surface area thereof that has been oxidized; specifically, it is a ratio between the amounts of the carbon monoxide adsorbed by the Ru metal before and after the oxidization. When Ru metal is oxidized, the surface area thereof becomes smaller than that before the oxidization due to sintering. Here, there is a correlation between the catalytic activity and the catalyst surface area such that the smaller the surface area is, the lower the catalytic activity; accordingly, a decrease in the specific surface area of the catalyst indicates a decrease in the catalytic activity.

As shown in FIG. 4, with the reforming catalyst, the higher the oxidization temperature is, the less the specific surface area of the catalyst; this clearly demonstrates that the catalytic activity decreases when the oxidization temperature is higher. This originates from the fact that sintering tends to occur more easily in the oxidization at a high temperature. For example, although the reforming catalyst is kept at about 650° C. during the hydrogen generation operation as described above, the activity of the reforming catalyst noticeably decreases due to sintering when the reforming catalyst is placed in an oxidizing atmosphere under a high temperature as the result of the stopping of the hydrogen generator.

In order to suppress such a decrease in the catalytic activity, it is necessary to avoid the interior of the hydrogen generator turning into an oxidizing atmosphere in the stop operation period in which reforming catalyst is at a high temperature and to reduce the temperature of the reforming catalyst quickly. For this reason, in the stop operation of the hydrogen generator, it is necessary to avoid performing the internal gas replacement operation as far as possible under a condition in which an oxidizing atmosphere is created when the reforming catalyst is at a high temperature. It is also desirable to avoid performing the internal gas replacement operation as far as possible in a material-rich condition, because when the reforming catalyst is at a high temperature, there is an increased possibility of carbon deposition or the like originating from thermal decomposition of the material and disproportionation reaction of carbon monoxide and carbon dioxide.

In contrast, when the temperature of the reforming catalyst is low, for example, when the hydrogen generator is stopped immediately after the start of the start-up operation, the decrease in the catalytic activity due to oxidization or the carbon deposition as described above does not occur easily, and thus, it becomes possible to perform the internal gas replacement operation under a material-rich condition. Nevertheless, since the reforming catalyst is at a low temperature in this case, steam condenses on the reforming catalyst, producing water (which is hereinafter referred to as "water condensation") if the steam content in the replacement gas used for the internal gas replacement operation is great, and the resultant water may increase the possibility of decreasing the catalytic activity. For this reason, it is desirable that the steam content in the replacement gas be small in this case.

As described above, in order to prevent decrease in the catalytic activity of the reforming catalyst, it is necessary to perform an internal gas replacement operation in an appropriate manner according to the temperature condition of the hydrogen generator in the stop operation. Accordingly, in the present embodiment, the hydrogen generator is stopped without decreasing the catalytic activity of the reforming catalyst by selecting and performing an appropriate internal gas replacement operation corresponding to temperature conditions of the hydrogen generator as appropriate in the following manner.

Hereinbelow, the internal gas replacement operation is detailed with reference to FIG. 5.

Figure 5:
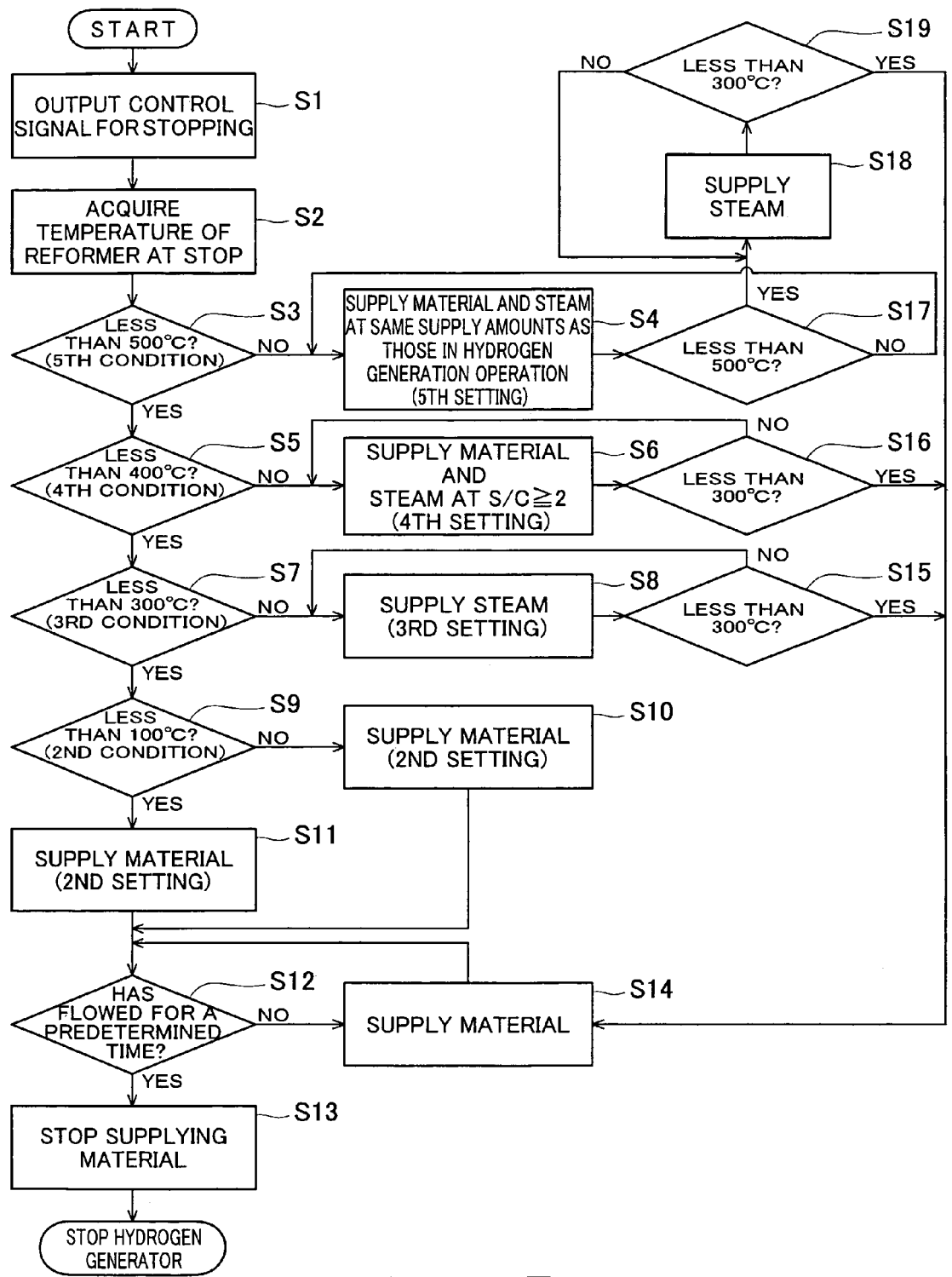
FIG. 5 is a flowchart schematically illustrating the content of a stop operation program stored in the controller shown in FIG. 1.

FIG. 5 is a flowchart schematically illustrating the content of a stop operation program stored in the controller 9. The outline of the internal gas replacement operation is as follows. First, a control signal for stopping is output from the processing and controlling portion 61 of the controller 9, shifting the hydrogen generator from the running operation to the stop operation; specifically, the supply of fuel and air to the combustor 4 is stopped (step S1). At the time of this shifting, that is, at the start of the stop operation, the temperature of the reformer 2 is detected by the reformer temperature sensor 3, and the temperature information is acquired by the processing and controlling portion 61 of the controller 9 (step S2). Then, the processing and controlling portion 61 compares the acquired temperature of the reformer 2 with first to fourth reference temperatures that are pre-set in the storage portion 62 and serve as determination criteria, and based on the result of the comparison, it determines which of the later-described first to fifth conditions matches the temperature condition of the reformer 2 at the start of the stop operation. Then, according to the determination result, an appropriate setting is selected from later-described first to fifth replacement settings pre-stored in the storage portion 62, and the material supply from the material supply portion 6 and the water supply from water supply portion 7 are controlled so that a replacement gas having the composition that complies with the setting is supplied to the interior of the hydrogen generator, whereby an internal gas replacement operation is carried out (steps S3 to S11).

Specifically, in the above-described determination by the processing and controlling portion 61, the temperature conditions of the reformer 2 are determined to fall into the following five conditions: a first condition in which water condensation occurs; a second condition in which water condensation and carbon deposition due to thermal decomposition of carbon originating from the material (herein the material is assumed to be methane alone) can be avoided; a third condition in which the thermal decomposition proceeds and carbon deposition occurs; a fourth condition in which disproportionation reaction of carbon monoxide and carbon dioxide proceeds and carbon deposition occurs; and a fifth condition in which the reforming catalyst oxidizes. Herein, the reference temperature for determining whether or not the reformer 2 is in the first condition is defined as a first reference temperature; the reference temperature for determining whether or not it is in the second condition is defined as a second reference temperature; the reference temperature for determining whether or not it is in the third condition is defined as a third reference temperature; and the reference temperature for determining whether or not it is in the fourth condition is defined as a fourth reference temperature. In this case, the first reference temperature is set at 100° C., the second reference temperature at 300° C., the third reference temperature at 400° C., and the fourth reference temperature at 500° C. These first to fourth reference temperatures are stored and set in the storage portion 62 by inputting the respective values to the operation input portion 63 while confirming them with the display portion 64 in the controller 9.

In addition, compositions of a replacement gas used for the internal gas replacement operation according to the temperature condition of the reformer 2 are pre-set in the storage portion 62 of the controller 9 such that, in the reformer 2, water condensation does not occur, carbon originating from the material or carbon originating from disproportionation reaction does not deposit, and the reforming catalyst does not oxidize. Here, a setting is made so that the material is used as the replacement gas for performing the internal gas replacement operation when the reformer 2 is in the first condition, in which water condensation occurs (hereinafter this setting is referred to as a "first replacement setting"); a setting is made so that the material is used as the replacement gas for performing the internal gas replacement operation when the reformer is in the second condition, in which water condensation and deposition of carbon originating from the material can be avoided (hereinafter this setting is referred to as a "second replacement setting"); a setting is made so that steam is used as the replacement gas for performing the internal gas replacement operation when the reformer is in the third condition, in which the carbon deposition occurs (hereinafter this setting is referred to as a "third replacement setting"); a setting is made so that a gas mixture of steam and the material, having a large steam content, is used as the replacement gas for performing the internal gas replacement operation when the reformer is in the fourth condition, in which deposition of carbon originating from disproportionation reaction occurs (hereinafter this setting is referred to as a "fourth replacement setting"); and a setting is made so that the material and steam are supplied at the same supply amounts as those in the hydrogen generation operation when the reformer is in the fifth condition, in which the reforming catalyst oxidizes (hereinafter this setting is referred to as a "fifth replacement setting").

As shown in FIG. 5, the controller 9 first determines whether or not the reformer 2 is in a condition in which oxidization of the catalyst occurs (the fifth condition) by comparing the temperature of the reformer 2 at the start of the stop operation, which is acquired in step S2, with the fourth reference temperature (500° C.) (step S3). If the detected temperature is equal to or higher than the fourth reference temperature, it is determined that the reformer 2 is in the condition in which oxidization of the catalyst occurs (that is, in the fifth condition), and accordingly, the fifth replacement setting is selected. Thereby, the material supply portion 6 and the water supply portion 7 are controlled in such a manner that the material and water are supplied to the hydrogen generating portion 1 at the same supply amounts as those in the hydrogen generation operation, whereby a gas mixture of the material and steam is supplied. As this gas mixture is supplied to the reformer 2, a reforming reaction, which is an endothermic reaction, proceeds in the reformer 2 being at a high temperature, as in the hydrogen generation operation, and as a result, the catalyst temperature can be reduced quickly (step S4).

On the other hand, if the detected temperature is less than the fourth reference temperature (500° C.), the controller 9 further compares the temperature of the reformer 2 with the third reference temperature (400° C.), and it determines whether or not the reformer 2 is in the condition in which disproportionation reaction occurs (that is, in the fourth condition) (step S5). If the detected temperature of the reformer 2 is equal to or higher than the third reference temperature (that is, equal to or higher than 400° C. and less than 500° C.), it is determined that the reformer 2 is in the condition in which oxidization of the catalyst does not occur easily and carbon deposition can occur due to disproportionation reaction (the fourth condition), and the fourth replacement setting is selected according to the determination result. When the reformer 2 is in the fourth condition, performing the internal gas replacement operation using only the material or a gas mixture having a small steam content may cause the carbon deposition due to disproportionation reaction to occur; however, because the water supply amount from the water supply portion 7 and the material supply amount from the material supply portion 6 are adjusted by the controller 9 according to the fourth replacement setting so that the ratio S/C of the replacement gas is equal to or greater than 2 (that is, so that the steam content is high), it is possible to prevent the carbon deposition due to disproportionation reaction (step S6).

Further, if the detected temperature is less than the third reference temperature (400° C.), the controller further compares the temperature of the reformer 2 with the second reference temperature (300° C.) and determines whether or not the reformer 2 is in the condition in which carbon originating from the material deposits due to thermal decomposition (that is, the third condition) (step S7). If the detected temperature of the reformer 2 is equal to or higher than the third reference temperature (that is, equal to or higher than 300° C. and less than 400° C.), it is determined that the reformer 2 is in the condition in which carbon originating from the material can deposit although disproportionation reaction does not easily occur (the third condition), and the third replacement setting is selected according to the determination result. Thereby, water is supplied from the water supply portion 7 to replace a gas within the hydrogen generator with steam (step S8).

Further, if the detected temperature is less than the second reference temperature (300° C.), the controller further compares the temperature of the reformer 2 with the first reference temperature (100° C.), and determines whether or not the reformer 2 is in the condition in which water condensation and deposition of carbon originating from the material can be avoided (that is, in the second condition) (step S9). If the detected temperature of the reformer 2 is equal to or higher than the first reference temperature (equal to or higher than 100° C. and less than 300° C.), it is determined that the interior of the hydrogen generator is in the condition in which water condensation and deposition of carbon originating from the material can be avoided (the second condition), and the second replacement setting is selected according to the determination result. Thereby, the material is supplied from the material supply portion 6 to replace the gas within the hydrogen generator with the material (step S10). On the other hand, if the detected temperature is less than the first reference temperature (100° C.), it is determined that the interior of the hydrogen generator is in the condition in which water condensation occurs (that is, in the first condition), and the first replacement setting is selected according to the determination result. Then, the material is supplied from the material supply portion 6 to replace the gas within the hydrogen generator with the material (step S11).

When the internal gas replacement operation is performed according to the temperature of the reformer 2 at the start of the stop operation as described above, the temperature of the hydrogen generator decreases as the time elapses from the start of the stop operation. For this reason, it is necessary that the type of gas used for the hydrogen generator internal replacement operation (specifically, compositions of the gas) be changed as appropriate according to the temperature decrease of the hydrogen generator. Therefore, here, in the stop operation even after the start of the stop operation, the controller 9 determines the temperature condition of the hydrogen generator from the detected temperature of the reformer 2 based on the first to fourth reference temperatures, and according to the determination, a setting of the replacement gas is selected as appropriate to switch between the settings to change the type of the replacement gas as appropriate.

For example, when the detected temperature of the reformer 2 is less than the first reference temperature (100° C.) at the start of the stop operation, the gas within the hydrogen generator is replaced with the material as described above (steps S9 and S11) and therefore water condensation does not occur even if the temperature of the hydrogen generator drops. Accordingly, in this case, after supplying the material for a predetermined time to flow the material in an amount sufficient for replacing the gas within the hydrogen generator, the material supply portion 6 is controlled so as to stop flowing the material, completing the stop operation (steps S12 and S13). Likewise, when the detected temperature at the start of the stop operation is equal to or higher than the first reference temperature and less than the second reference temperature (equal to or higher than 100° C. and less than 300° C.), the gas within the hydrogen generator is replaced with the material as described above (steps S9 and S10) and therefore water condensation does not occur even if the temperature of the hydrogen generator drops. Therefore, after supplying the material for a predetermined time to flow the material in an amount sufficient for replacing the gas within the hydrogen generator, the material supply portion 6 is controlled so as to stop the flowing the material, completing the stop operation (steps S12 and S13).

On the other hand, when the detected temperature of the reformer 2 is equal to or higher than the second reference temperature at the start of the stop operation and less than the third reference temperature (equal to or higher than 300° C. and less than 400° C.), the replacement is performed by flowing steam as described above; nevertheless, such a replacement with the use of steam may cause water condensation in the interior of the hydrogen generator if the temperature of the hydrogen generator becomes lower than the first reference temperature (100° C.). In view of this, here, with detecting the temperature of the reformer 2 in the internal gas replacement operation by the reformer temperature sensor 3, the water supply from the water supply portion 7 to the hydrogen generating portion 1 is stopped if the detected temperature becomes lower than the second reference temperature (300° C.) (step S15), to stop flowing steam, while the material supply portion 6 is controlled so as to flow the material for a predetermined time in an amount sufficient for replacing the gas within the hydrogen generator. Thereafter, the material supply portion 6 is controlled so as to stop flowing the material, completing the stop operation (steps S14, S12, and S13).

Further, when the detected temperature of the reformer 2 is equal to or higher than the third reference temperature and less than the fourth reference temperature (equal to or higher than 400° C. and less than 500° C.) at the start of the stop operation, the replacement is performed with a gas mixture of steam and the material. Therefore, as in the foregoing, if the temperature of the reformer 2 becomes lower than the second reference temperature (300° C.) (step S16), the supply of water from the water supply portion 7 to the hydrogen generating portion 1 is stopped so as to stop flowing steam, in order to prevent water condensation due to the temperature drop, and the material is flowed for a predetermined time in an amount sufficient for replacing the gas within the hydrogen generator. Thereafter, the material supply portion 6 is controlled so as to stop flowing the material, completing the stop operation (steps S14, S12, and S13).

On the other hand, when the detected temperature of the reformer 2 is higher than the fourth reference temperature (500° C.) at the start of the stop operation, water and the material are supplied and the replacement is performed using the gas mixture as described above (step S4) until the temperature of the hydrogen generator becomes lower than the fourth reference temperature (500° C.), and if the temperature becomes lower than the fourth reference temperature, the material supply portion 6 is controlled so as to stop the supply of the material and to flow only the steam (steps S17 and S18). Furthermore, if the temperature of the reformer 2 becomes lower than the second reference temperature (300° C.), the water supply portion 7 is controlled so as to stop the supply of water, while the material supply portion 6 is controlled so as to supply the material again and to flow the material for a predetermined time in an amount sufficient for replacing the gas within the hydrogen generator. Thereafter, the material supply portion 6 is controlled so as to stop flowing the material, completing the stop operation (steps S19, S14, S12, and S13).

Thus, by changing the replacement gas used for the hydrogen generator internal replacement operation as appropriate according to the temperature decrease of the hydrogen generator associated with the elapse of time, it becomes possible to perform the stop operation quickly while preventing water condensation and carbon deposition of the material regardless of the temperature decrease.

As described above, the hydrogen generator according to the present embodiment makes it possible to perform the internal gas replacement operation with the use of an appropriate replacement gas corresponding to the temperature of the reformer 2 at the start of the hydrogen generator stop operation and the temperature change of the reformer 2 during the stop operation; therefore, such problems as sintering, oxidization, and the like of the reforming catalyst originating from temperatures, and clogging of passages due to carbon deposition can be reliably avoided while effectively utilizing the replacement gas efficiently. Consequently, it becomes possible to prevent decrease in the catalytic activity of the reforming catalyst, and as a result, it becomes possible to carry out a good, stable hydrogen generation.

As an implementation example, the operation and stop of the hydrogen generator was repeatedly carried out according to the above-described method. Even after the operation cycle was repeated about 200 times, the reforming catalyst did not show a noticeable decrease in the catalytic activity.

It should be noted that settings of compositions of the replacement gas and settings of the reference temperatures are not limited to the foregoing, as long as they are set appropriately taking into consideration the temperature condition of the hydrogen generator in the stop operation.

For example, when the temperature condition of the hydrogen generator at the start of the stop operation is the second condition, either steam alone may be used as the replacement gas or a gas mixture of the material and steam may be used as the replacement gas. When using a replacement gas containing steam as described above, the supplying of steam is stopped and the replacement gas is changed over to the material at the point where the temperature of the hydrogen generator has become lower than 100° C. during the stop operation period. When the temperature condition of the hydrogen generator at the start of the stop operation is the third condition, a gas mixture of the material and steam may be used as the replacement gas. When the temperature condition of the hydrogen generator at the start of the stop operation is the fourth condition and the fifth condition, steam alone may be used as the replacement gas. It should be noted that when the temperature condition of the hydrogen generator at the start of the stop operation is the fifth condition, it is possible to reduce the catalyst temperature quickly because of the endothermic reaction by supplying the material along with the steam as described above; therefore, it is desirable that a gas mixture of steam and the material be supplied as the replacement gas, as described above. Thus, sintering due to the oxidization of catalyst can be reliably prevented.

Furthermore, air or an inert gas such as nitrogen supplied from outside of the hydrogen generator may be used as the replacement gas other than steam and the material; specifically, the hydrogen generator may comprise a nitrogen gas container or an air supply pump. By performing the internal gas replacement operation with an inert gas in combination with the material and steam, the amount of inert gas used can be considerably reduced in comparison with conventional cases where the replacement is performed only with an inert gas. Moreover, by using air as the replacement gas either alone or in combination with the material and steam, the supply amounts of the material and water in the stop operation of the hydrogen generator can be reduced. For example, when the temperature condition of the hydrogen generator at the start of the stop operation is the first condition, either a gas mixture of the material and an inert gas or air may be used as the replacement gas. Furthermore, when the temperature condition of the hydrogen generator at the start of the stop operation is one of the second to fifth conditions, the hydrogen generator internal replacement operation may be performed with a gas mixture containing two or more kinds of any of the material, steam, an inert gas, and air at an appropriate proportion.

In addition, as a modified example of the present embodiment, the following configuration is also possible: for example, the hydrogen generator is provided with a passage closing valve in the vicinity of the outlet (outlet port) of the reformed gas passage d thereof, the passage closing valve being closed while stopping the supply of the material when completing the stop operation, and a replacement gas is filled into the hydrogen generator that has stopped.

Embodiment 2

A hydrogen generator according to Embodiment 2 of the present invention has a similar hydrogen generator configuration to that of Embodiment 1. In the hydrogen generator of the present embodiment, an internal gas replacement operation method is selected appropriately according to the temperature condition of the hydrogen generator at the start of the stop operation as in Embodiment 1; however, in contrast to Embodiment 1, in which the temperature condition of the hydrogen generator is determined by detecting the temperature of the reformer 2 at the start of the stop operation, in the present embodiment, the temperature condition of the hydrogen generator is determined based on an operating time before the start of the stop operation.

In many cases, the temperature of the interior of a hydrogen generator is dependent on its operating time. For example, in cases where the hydrogen generator is operated under a certain condition, the longer the operation time is, the higher the temperature of the interior of the hydrogen generator becomes.

Figure 6:
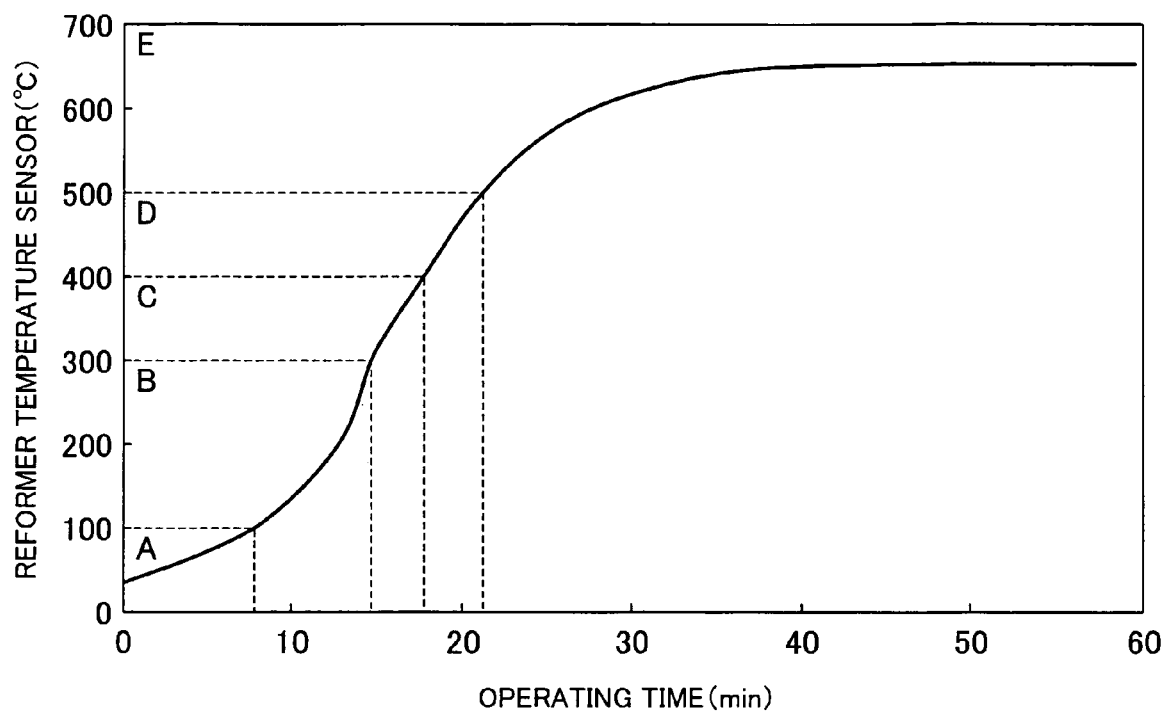
FIG. 6 is a graph illustrating the relationship between operating time and temperature of the reformer, which are stored in a controller of a hydrogen generator according to Embodiment 2 of the present invention.

FIG. 6 is a graph illustrating the relationship between operating time and temperature of the reformer 2. As shown in FIG. 6, the longer the operating time is, the higher the temperature of the reformer 2 becomes; the temperature of the reformer 2 is less than 100° C. in a period from the start (at the start-up) until 8 minutes later (period A); the temperature is equal to or higher than 100° C. and less than 300° C. in a period from 8 minutes to 15 minutes (period B); the temperature is equal to or higher than 300° C. and less than 400° C. in a period from 15 minutes to 18 minutes (period C); the temperature is equal to or higher than 400° C. and less than 500° C. in a period from 18 minutes to 22 minutes (period D); and the temperature is 500° C. or higher after 22 minutes (period E).

Herein, due to the fact that there exists such a correlation between the temperatures of the reformer 2 and the operating times of the hydrogen generator, the temperature condition of the hydrogen generator at the start of a stop operation is determined based on the operating time up to the start of the stop operation of the hydrogen generator, and according to the determination result, an appropriate replacement setting is selected to perform an internal gas replacement operation. Hereinbelow, a stop operation in the present embodiment will be described referring to a stop operation program stored in the controller 9.

Figure 7:
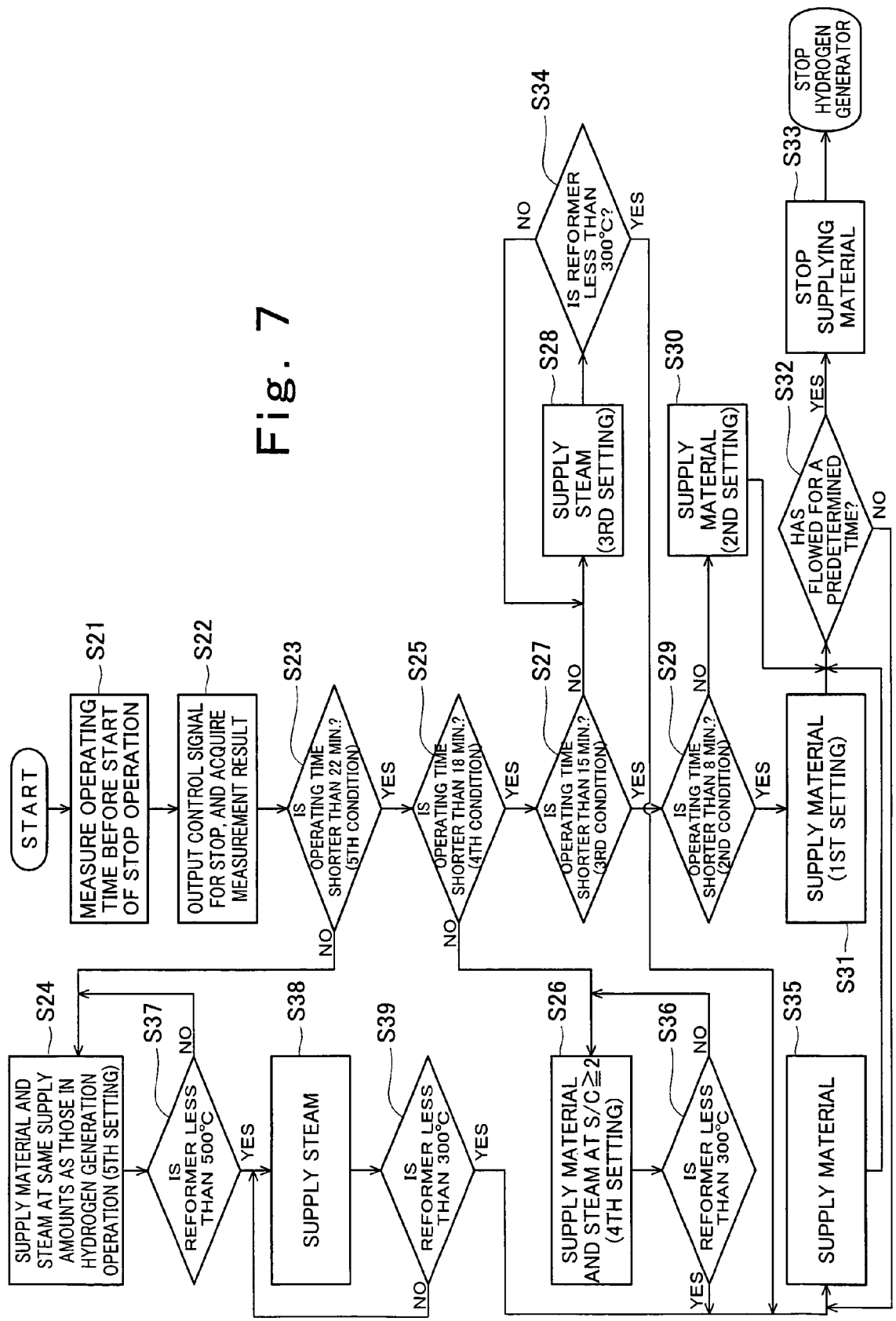
FIG. 7 is a flowchart schematically illustrating the content of a stop operation program stored in the controller of the hydrogen generator according to Embodiment 2 of the present invention.

FIG. 7 is a flowchart schematically illustrating the content of a stop operation program stored in the controller 9. As shown in FIG. 7, the clock portion 65 of the controller 9 measures, as an operating time, the elapsed time from a start-up of the hydrogen generator (that is, from when a control signal for starting is output) to the start of the stop operation of the hydrogen generator (that is, to when a control signal for stopping is output); then, the measurement result is transferred to the controller 9 at the start of the stop operation of the hydrogen generator and is acquired by the processing and controlling portion 61 (steps S21 and S22). Meanwhile, the correlation data between operating times and temperatures of the reformer 2 as shown in FIG. 6 are pre-stored the storage portion 62 of the controller 9. Then, at the start of a stop operation, the processing and controlling portion 61 compares the acquired operating time with the correlation data to determine which of the first to fifth conditions the hydrogen generator is in. Then, based on the determination result, an appropriate setting is selected among the first to fifth replacement settings, and an internal gas replacement operation is carried out (steps S23 to S31).

Specifically, first, it is determined whether or not the operating time is shorter than 22 minutes (step S23). If the operating time is equal to or longer than 22 minutes, the processing and controlling portion 61 estimates, based on the data stored in the storage portion 62, that the temperature of the reformer 2 is equal to or higher than 500° C., and accordingly determines that the reformer 2 is in a condition in which oxidization of the reforming catalyst occurs (the fifth condition). Therefore, in this case, the fifth replacement setting is selected so that the material and water are supplied to the hydrogen generating portion 1 in the same supply amounts as those in the hydrogen generation operation, and the replacement operation is carried out with a gas mixture of the material and steam (step S24).

Further, if the operating time is shorter than 22 minutes, it is determined whether or not the operating time is shorter than 18 minutes (step S25). If the operating time is equal to or longer than 18 minutes and shorter than 22 minutes, the processing and controlling portion 61 estimates that the temperature of the reformer 2 is equal to or higher than 400° C. and less than 500° C., and accordingly determines that the reformer 2 is in a condition in which the oxidization of the reforming catalyst does not occur and disproportionation reaction occurs (that is, in the fourth condition). Therefore, the fourth replacement setting is selected in this case, and the replacement operation is performed using a gas mixture of the material and steam having a S/C ratio of 2 or greater as the replacement gas (step S26).

If the operating time is shorter than 18 minutes, it is further determined whether or not the operating time is shorter than 15 minutes (step S27). If the operating time is equal to or longer than 15 minutes and shorter than 18 minutes, the processing and controlling portion 61 estimates that the temperature of the reformer 2 is equal to or higher than 300° C. and less than 400° C., and accordingly, determines that the reformer 2 is in a condition in which disproportionation reaction does not occur and carbon originating from the material deposits due to thermal decomposition (that is, in the third condition). Therefore, the third replacement setting is selected in this case, and the replacement operation is performed using steam as the replacement gas (step S28).

If the operating time is shorter than 15 minutes, it is further determined whether or not the operating time is shorter than 8 minutes (step S29). If the operating time is equal to or longer than 8 minutes and shorter than 15 minutes, the processing and controlling portion 61 estimates that the temperature of the reformer 2 is equal to or higher than 100° C. and less than 300° C., and accordingly determines that the reformer 2 is in a condition in which water condensation and deposition of carbon originating from the material are avoidable (that is, in the second condition). Therefore, the second replacement setting is selected in this case, and the replacement operation is performed using the material as the replacement gas (step S30).

If the operating time is shorter than 8 minutes, the processing and controlling portion 61 estimates that the temperature of the reformer 2 is less than 100° C., and accordingly determines that the reformer 2 is in a condition in which water condenses (that is, in the first condition). Therefore, the first replacement setting is selected in this case, and the replacement operation is performed using the material as the replacement gas (step S31).

Here, in the present embodiment as well as in Embodiment 1, the type of replacement gas is changed according to the temperature decrease of the reformer 2 during internal replacement operation.

Specifically, when it is determined that the reformer 2 at the start of the stop operation is in the first condition, the gas within the hydrogen generator is replaced with the material as described above (steps S29 and S31) and therefore water condensation does not occur even if the temperature of the hydrogen generator drops. Accordingly, in this case, after supplying the material for a predetermined time so that the material is flowed in an amount sufficient for replacing the gas within the hydrogen generator, the material supply portion 6 is controlled so as to stop flowing the material, completing the stop operation (steps S32 and S33). Likewise, when it is determined that the reformer 2 at the start of the stop operation is in the second condition, the gas within the hydrogen generator is replaced with the material (steps S29 and S30) and therefore water condensation does not occur even if the temperature of the hydrogen generator drops. Accordingly, as in the foregoing, after flowing the material for a predetermined time in an amount sufficient for replacing the gas within the hydrogen generator, the material supply portion 6 is controlled so as to stop flowing the material, completing the stop operation (steps S32 and S33).

On the other hand, when it is determined that the reformer 2 at the start of the stop operation is in the third condition, the gas within the hydrogen generator is replaced with steam as described above (steps S27 and 28). Therefore, water condensation can occur if the temperature of the hydrogen generator drops and becomes lower than 100° C. For this reason, herein, if the temperature of the reformer 2 detected by the reformer temperature sensor 3 becomes less than 300° C. (step S34), the water supply portion 7 is controlled so as to stop flowing steam, while the material is flowed for a predetermined time in an amount sufficient for replacing the gas within the hydrogen generator. Thereafter, the material supply portion 6 is controlled so as to stop flowing the material, completing the stop operation (steps S35, S32, and S33).

When it is determined that the reformer 2 at the start of the stop operation is in the fourth condition, the gas within the hydrogen generator is replaced with a gas mixture of steam and the material as described above (steps S25 and S26); therefore, as in the foregoing, if the temperature of the hydrogen generator drops and becomes less than 300° C. (step S36), the water supply portion 7 is controlled so as to stop the supply of water and to stop flowing steam in order to prevent water condensation, while the material is flowed for a predetermined time in an amount sufficient for replacing the gas within the hydrogen generator. Thereafter, the material supply portion 6 is controlled so as to stop flowing the material, completing the stop operation (steps S35, S32, and S33).

In the case where it is determined that the reformer 2 at the start of the stop operation is in the fifth condition, if the temperature of the reformer 2 detected by the reformer temperature sensor 3 becomes lower than 500° C. (step S37), the material supply portion 6 is controlled so as to stop the supply of the material while steam alone is flowed as the replacement gas (step S38). Then, if the temperature of the reformer 2 becomes lower than 300° C., (step S39), the water supply portion 7 is controlled so as to stop the supply of water to stop the supply of steam, while the material is flowed for a predetermined time in an amount sufficient for replacing the gas within the hydrogen generator. Thereafter, the material supply portion 6 is controlled so as to stop flowing the material, completing the stop operation (steps S35, S32, and S33).

As described above, the hydrogen generator according to the present embodiment attains the same advantageous effects as those in Embodiment 1.

In the present embodiment, there may be variations in the temperature condition of the hydrogen generator even with the same operating time, depending on the start-up conditions or operating conditions of the hydrogen generator. For this reason, it is preferable that the identifying of the temperature condition of the hydrogen generator through the temperature of the reformer 2 as in Embodiment 1 be also used along with the control through the operating time. This makes it possible to improve the accuracy in the determination of the temperature condition of the hydrogen generator.

The hydrogen generators according to the present invention are applicable to various uses and may comprise other configurations than the foregoing, as appropriate, according to the uses. For example, a hydrogen generator that generates hydrogen to be supplied to a fuel cell system requires generating a hydrogen having a reduced carbon monoxide concentration, and therefore further comprises a shifter and a purifier, provided downstream of the reformer 2. In the following, hydrogen generators having such a configuration are described as illustrative examples.

Embodiment 3

Figure 8:
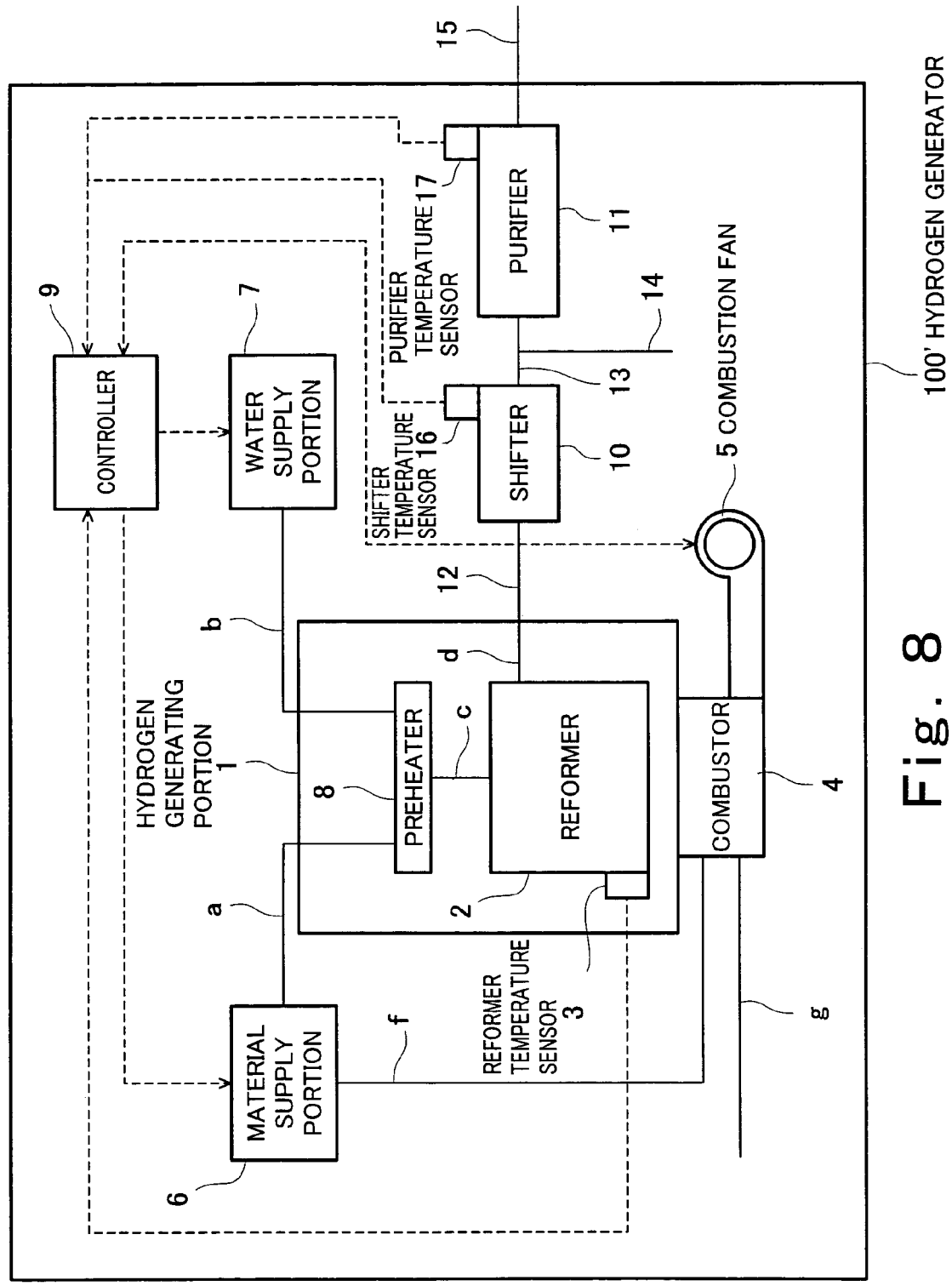
FIG. 8 is a schematic block diagram illustrating the configuration of a hydrogen generator according to Embodiment 3 of the present invention.

FIG. 8 is a schematic block diagram illustrating the configuration of a hydrogen generator according to Embodiment 3 of the present invention. As shown in FIG. 8, the hydrogen generator of the present embodiment has a similar configuration to that of the hydrogen generator of Embodiment 1 and differs from that of Embodiment 1 in the following points.

A hydrogen generator 100' of the present embodiment further comprises, on the downstream side of the hydrogen generating portion 1, a shifter 10 and a purifier (carbon monoxide selective oxidization portion) 11 arranged in this order. Its specific configuration is as follows; for example, in a hydrogen generator having a cylinder-shaped reformer 2 as shown in FIG. 2, the shifter 10 and the purifier 11 are disposed further downstream of the reformer 2 in the heat transfer path for the heat generated by the combustor 4. Due to the heating by the combustor 4, the temperatures of the shifter 10 and the purifier 11 during operation become about 200-250° C., and about 100° C.-150° C., respectively.

The shifter 10 comprises a platinum group metal-based shift catalyst. The purifier 11 comprises a platinum group metal-based oxidization catalyst. The gas inlet of the shifter 10 is connected to a reformed gas outlet pipe 12 connected to the reformed gas passage d of the reformed gas reaction portion 2 of the hydrogen generating portion 1, and the gas outlet of the shifter 10 is connected to the gas inlet of the purifier 11 through a shifted gas outlet pipe 13. An air supply pipe 14 for introducing air is connected to the shifted gas outlet pipe 13, and through the air supply pipe 14, air that is used for oxidization reaction in the purifier 11 is supplied to the purifier 11. The gas outlet of the purifier 11 is connected to a hydrogen gas outlet pipe 15.

Further, the shifter 10 and the purifier 11 are provided with a shifter temperature sensor 16 and a purifier temperature sensor 17, respectively, which specifically are composed of thermocouples. The shifter temperature sensor 16 is arranged so as to detect the temperature of the shift catalyst and/or the interior of the shifter 10 (the temperature of the atmosphere or the temperature of the constituting member), while the purifier temperature sensor 17 is arranged so as to detect the temperature of the oxidization catalyst and/or the interior of the purifier 11 (the temperature of the atmosphere or the temperature of the constituting member). The temperature information of the shifter 10 and the purifier 11 detected by the shifter temperature sensor 16 and the purifier temperature sensor 17 is transferred to the controller 9.

In the hydrogen generator 100' thus configured, a reformed gas generated by the reformer 2 in a manner as in Embodiment 1 is supplied from the hydrogen generating portion 1 to the shifter 10 through the reformed gas outlet pipe 12. The shifter 10 processes the reformed gas through a shift reaction using a shift catalyst to reduce the carbon monoxide concentration in the reformed gas. The gas obtained by the shifter 10, that is, a shifted gas, is supplied to the purifier 11 through the shifted gas outlet pipe 13. At this time, air is supplied together with the shifted gas to the purifier 11 through the air supply pipe 14 connected to the shifted gas outlet pipe 13. The purifier 11 processes the shifted gas through an oxidization reaction using air and an oxidization catalyst to thereby reduce the carbon monoxide concentration in the shifted gas further. The hydrogen gas the carbon monoxide concentration of which is thus reduced is taken out of the hydrogen generator through the hydrogen gas outlet pipe 15.

In the previously-described Embodiment 1, the temperature of the reformer 2 is detected by the reformer temperature sensor 3 at the start of the stop operation of the hydrogen generator, and the temperature condition of the hydrogen generator is determined by the controller 9 based on the detected temperature. However, in the hydrogen generator of the present embodiment, in addition to detecting the temperature of the reformer 2 by the reformer temperature sensor 3 at the start of the stop operation, the temperature of the shifter 10 is detected by the shifter temperature sensor 16 and also the temperature of the purifier 11 is detected by the purifier temperature sensor 17. Then, the controller 9 determines the temperature condition of the hydrogen generator based on the detected temperatures of the reformer 2, the shifter 10, and the purifier 11, performing a replacement operation using a replacement gas setting corresponding to the temperature condition of the hydrogen generator according to the determination result. Such a configuration of the present embodiment attains advantageous effects as follows.

Figure 9:
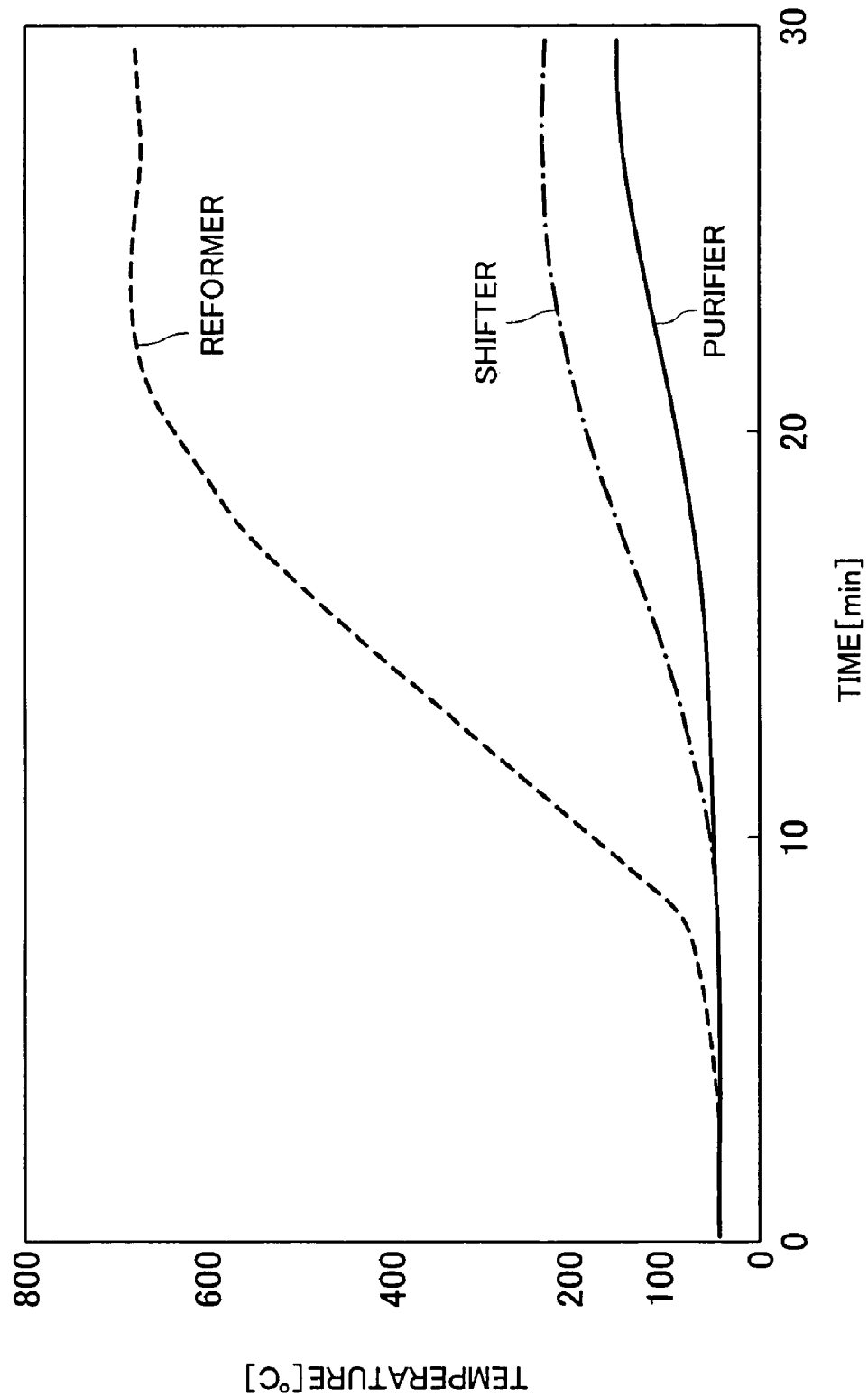
FIG. 9 is a graph illustrating temperature profiles of a reformer, a shifter, and a purifier, in the case where the hydrogen generator was started up from the state in which the temperatures were sufficiently low.

Temperature conditions of the hydrogen generator at the start of the stop operation vary not only depending on the operating states before the stop of the hydrogen generator as described previously but also depending on the portions that constitute hydrogen generator due to their configurations and arrangements. For example, FIG. 9 shows detected temperatures by the reformer temperature sensor 3, the shifter temperature sensor 16, and the purifier temperature sensor 17 when the hydrogen generator is operated after having been started from a sufficiently-cooled state. As shown in FIG. 9, the hydrogen generator is in a sufficiently cooled condition before the start-up here, the temperatures of the reformer 2, the shifter 10, and the purifier 11 detected by the reformer temperature sensor 3, the shifter temperature sensor 16, and the purifier temperature sensor 17 are about room temperature. When the hydrogen generator is started up from such a cooled condition, the temperature of the reformer 2 quickly rises since the reformer 2 is located upstream of the shifter 10 and the purifier 11 in the heat transfer path of the combustor 4, owing to the hydrogen generator configuration, and is therefore heated by the heat of the combustor 4 preferentially over the shifter 10 and purifier 11. Thus, the temperature of the reformer 2 becomes high even if the elapsed time from the start-up is short. On the other hand, the shifter 10 and the purifier 11 are located downstream of the reformer 2 in the heat transfer path of the heat from the combustor 4, and consequently, their temperatures go up more gently than that of the reformer 2.

Figure 10:
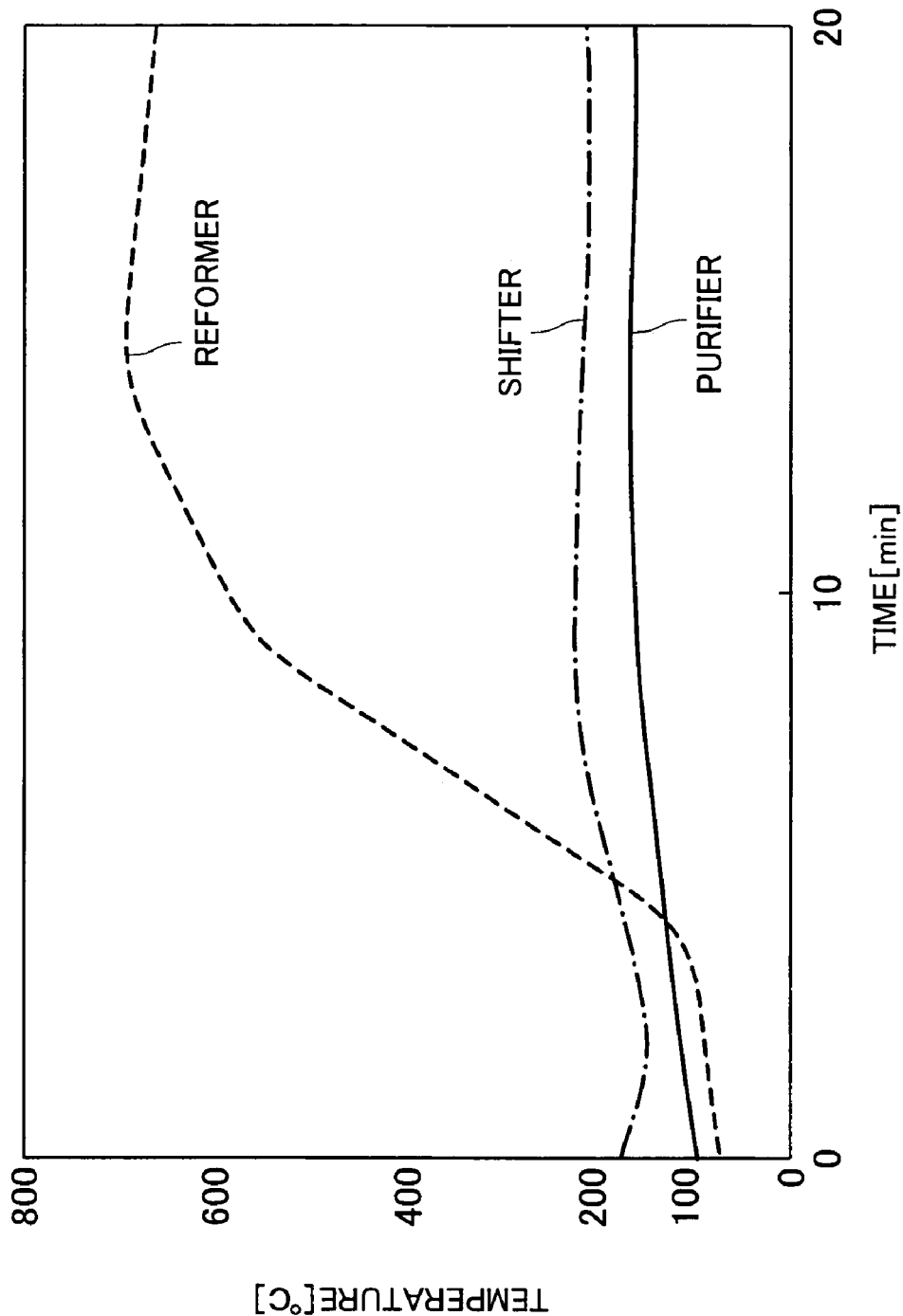
FIG. 10 is a graph illustrating temperature profiles of the reformer, the shifter, and the purifier, in the case where the hydrogen generator was operated for a long time, temporarily stopped, and then restarted immediately.

In contrast, FIG. 10 shows the temperatures detected by the reformer temperature sensor 3, the shifter temperature sensor 16, and the purifier temperature sensor 17, when the hydrogen generator was operated for a long time, stopped temporarily, and then quickly restarted. When the hydrogen generator is temporarily stopped after having been operated for a long time, the reformer 2, which was kept at a high temperature during the operation, shows a rapid drop in temperature as the hydrogen generator is stopped. On the other hand, the shifter 10 and the purifier 11, which were kept at lower temperatures than the reformer 2 during the operation, do not show such a rapid drop in temperature as the reformer 2, and are given the heat dissipated from the reformer 2, resulting in a higher temperature than that of the reformer 2. When restarting the operation after the temporary stop, the reformer 2 is heated by the heat from the combustor 4 preferentially over the shifter 10 and the purifier 11, quickly raising its temperature. Meanwhile, the shifter 10 and the purifier 11 show more gentle temperature increases than that of the reformer 2; however, in this case, their temperatures rise more rapidly than the case shown in FIG. 9 because their temperatures at the restart of the operation are comparatively high as described above, although they are heated more gently than the reformer 2.

Next, a consideration about a case in which, for example, the hydrogen generator is stopped 10 minutes after the start-up under the above-described respective operating states shown in FIGS. 9 and 10 will be described. As seen from FIGS. 9 and 10, in the case of FIG. 9, in which the hydrogen generator is cooled to room temperature, the temperature of the reformer 2 is about 200° C. at the start of the stop operation of the hydrogen generator, while in the case of FIG. 10, the temperature of the reformer 2 is about 600° C. at the start of the stop operation. On the other hand, the temperatures of the shifter 10 and the purifier 11 are about room temperature at the start of the stop operation in the case of FIG. 9, while the temperature of the shifter 10 is about 200° C. and the temperature of the purifier 11 is about 150° C. at the start of the stop operation in the case of FIG. 10.

When the hydrogen generator is stopped 10 minutes after the start-up and the temperature condition of the hydrogen generator is determined according to the temperature of the reformer 2 as in Embodiment 1, the temperature of the reformer 2 is about 200° C. in the case of FIG. 9; thus, it is determined that the temperature condition of the hydrogen generator is the second condition (that is, in the condition in which water condensation and carbon deposition are avoidable). Here, for example, if the second replacement setting is made so as to use a gas mixture of the material and steam as the replacement gas in the case of the hydrogen generator being in the second condition, the internal gas replacement operation is performed using the second replacement setting, that is, with the gas mixture, according to the determination result based on the temperature of the reformer 2. Nevertheless, the steam in the replacement gas condenses in the shifter 10 and the purifier 11, producing water, because the temperatures of the shifter 10 and the purifier 11 are less than 100° C. as mentioned above. Thus, although a replacement setting is selected according to the temperature detected by the reformer temperature sensor 3 at the start of the stop operation, a decrease in the catalytic activity may occur because of water condensation in the shifter 10 and the purifier 11.

On the other hand, in the case of FIG. 10, the temperature of the reformer 2 is about 600° C., and accordingly it is determined that the temperature condition of the hydrogen generator is the fifth condition (that is, in the condition in which oxidization reaction of the reforming catalyst occurs). Here, for example, if the fifth replacement setting is made so as to use a gas mixture of the material and steam as the replacement gas in the case of the hydrogen generator being in the fifth condition, the internal gas replacement operation is performed using a gas mixture of the material and steam according to the fifth replacement setting; in this case, since the temperatures of the shifter 10 and the purifier 11 are higher than 100° C., water condensation does not occur from the steam in the replacement gas.

As described above, temperature conditions of the reformer 2, the shifter 10, and the purifier 11 vary depending on the operating state before the hydrogen generator is stopped. In particular, the temperature conditions of the shifter 10 and the purifier 11 are greatly affected by the operating state before the stop of the hydrogen generator since their temperature increases associated with the heating by the combustor 4 are more gentle than that of the reformer 2. For this reason, in order to prevent a decrease in the catalytic activity more reliably, it is preferable that the temperature conditions of the hydrogen generator be identified more accurately by not only determining the temperature condition of the hydrogen generator only through the temperature of the reformer 2 at the start of the stop operation of the hydrogen generator but also by determining comprehensively by taking into account the temperatures of the shifter 10 and the purifier 11.

In the present embodiment, the shifter temperature sensor 16 that detects the temperature of the shifter 10 and the purifier temperature sensor 17 that detects the temperature of the purifier 11 are further provided in addition to the reformer temperature sensor 3 that detects the temperature of the reformer 2. At the start of the stop operation of the hydrogen generator, the temperatures of the reformer 2, the shifter 10, and the purifier 11 are detected by the reformer temperature sensor 3, the shifter temperature sensor 16, and the purifier temperature sensor 17, respectively. The detected temperature information is transferred to the processing and controlling portion 61 of the controller 9. Upon acquiring these temperatures, the processing and controlling portion 61 determines the temperature condition of the hydrogen generator in the following manner.

Specifically, in the method of determining the temperature condition of the hydrogen generator of the present embodiment, the processing and controlling portion 61 first determines the temperature condition of the hydrogen generator at the start of the stop operation to be one of the first to fifth conditions, by comparing the temperature of the reformer 2 detected by the reformer temperature sensor 3 at the start of the stop operation with the first to fourth reference temperatures, as in the method of Embodiment 1 as shown in FIG. 5. Then, in addition to the determination based on the temperature of the reformer 2, it is further determined in this case whether or not the temperature of the shifter 10 detected by the shifter temperature sensor 16 at the start of the stop operation and the temperature of the purifier 11 detected by the purifier temperature sensor 17 at the start of the stop operation are less than 100° C. If at least one of the shifter 10 and the purifier 11 is less than 100° C., the internal gas replacement operation using a gas free of steam, even if the temperature of the reformer 2 is equal to or higher than 100° C. On the other hand, if the temperatures of the shifter 10 and the purifier 11 are equal to or higher than 100° C., the internal gas replacement operation is performed using a gas containing steam, according to the replacement setting selected based on the temperature of the reformer 2.

Moreover, in the present embodiment, the type of replacement gas is changed by selecting an optimum replacement setting as appropriate according to the temperature changes of the reformer 2, the shifter 10, and the purifier 11 in the stop operation, as previously described in Embodiment 1 during the hydrogen generator internal replacement operation.

The present embodiment enables the temperature condition of the hydrogen generator to be identified more accurately at the start of a stop operation, making it possible to perform an internal gas replacement operation more appropriately. Specifically, an internal gas replacement operation can be performed while preventing water condensation in the shifter 10 and the purifier 11 as well as in the reformer 2. For example, as an implementation example of the present embodiment, the hydrogen generator was operated under the respective conditions of FIGS. 9 and 10, then the hydrogen generator was stopped 10 minutes after the start-up, with an internal gas replacement operation performed according to the above-described method, and thereafter the hydrogen generator was restarted; this operation cycle was repeated about 100 times. The reforming catalyst did not show a noticeable decrease in the catalytic activity, and a good and stable hydrogen production was possible.

Embodiment 4

A hydrogen generator according to Embodiment 4 of the present invention has a similar configuration to the hydrogen generator of Embodiment 3 and determines the temperature condition of the hydrogen generator based on the temperature of the reformer 2 detected by the reformer temperature sensor 3 in a similar manner to Embodiment 1. In this embodiment, data pertaining to the operating states of the hydrogen generator before the stop, specifically, such data as operating times before the stop and temperatures of various portions at the start-up and during operation (hereafter these data are referred to as "operation data"), are stored in the storage portion 62 of the controller 9, and the temperature condition of the hydrogen generator is determined taking these operation data into account along with the temperature of the reformer 2, in determining the temperature condition of the hydrogen generator at the start of the stop operation.

When the temperature condition of the hydrogen generator is determined from the temperature of the reformer 2 at the start of the stop operation alone, an appropriate internal gas replacement operation may not be performed in some cases because the temperature conditions of the shifter 10 and the purifier 11 are not reflected, as previously described in Embodiment 3. As shown in FIGS. 9 and 10, the temperatures of the shifter 10 and the purifier 11 at the start of the stop operation are determined by the operating history concerning the running and stopping of the hydrogen generator, the operating time before the stop, and the like. In view of this, in the present embodiment, the operation history concerning the operation and stop of the hydrogen generator and the operating time before the stop are stored in the storage portion 62 of the controller 9 as the operation data of the hydrogen generator, and when determining the temperature condition of the hydrogen generator, these operation data are taken into consideration along with the temperature of the reformer 2. By taking into consideration the operation history concerning the operation and stop of the hydrogen generator and the operating time before the stop in this way, it is possible to estimate the conditions of other portions than the reformer 2, such as the shifter 10 and the purifier 11, at the start of the stop operation without measuring their temperatures directly, and consequently, the temperature condition of the hydrogen generator can be determined comprehensively taking into consideration temperatures of various portions. Thus, the internal gas replacement operation can be performed taking into consideration temperature conditions of the hydrogen generator that are not reflected in the detected temperature by the reformer temperature sensor 3, in this case the temperature conditions of the shifter 10 and the purifier 11 etc., and as a result, it becomes possible to carry out an more appropriate internal gas replacement operation, as in the case of Embodiment 3.

Embodiment 5

Figure 11:
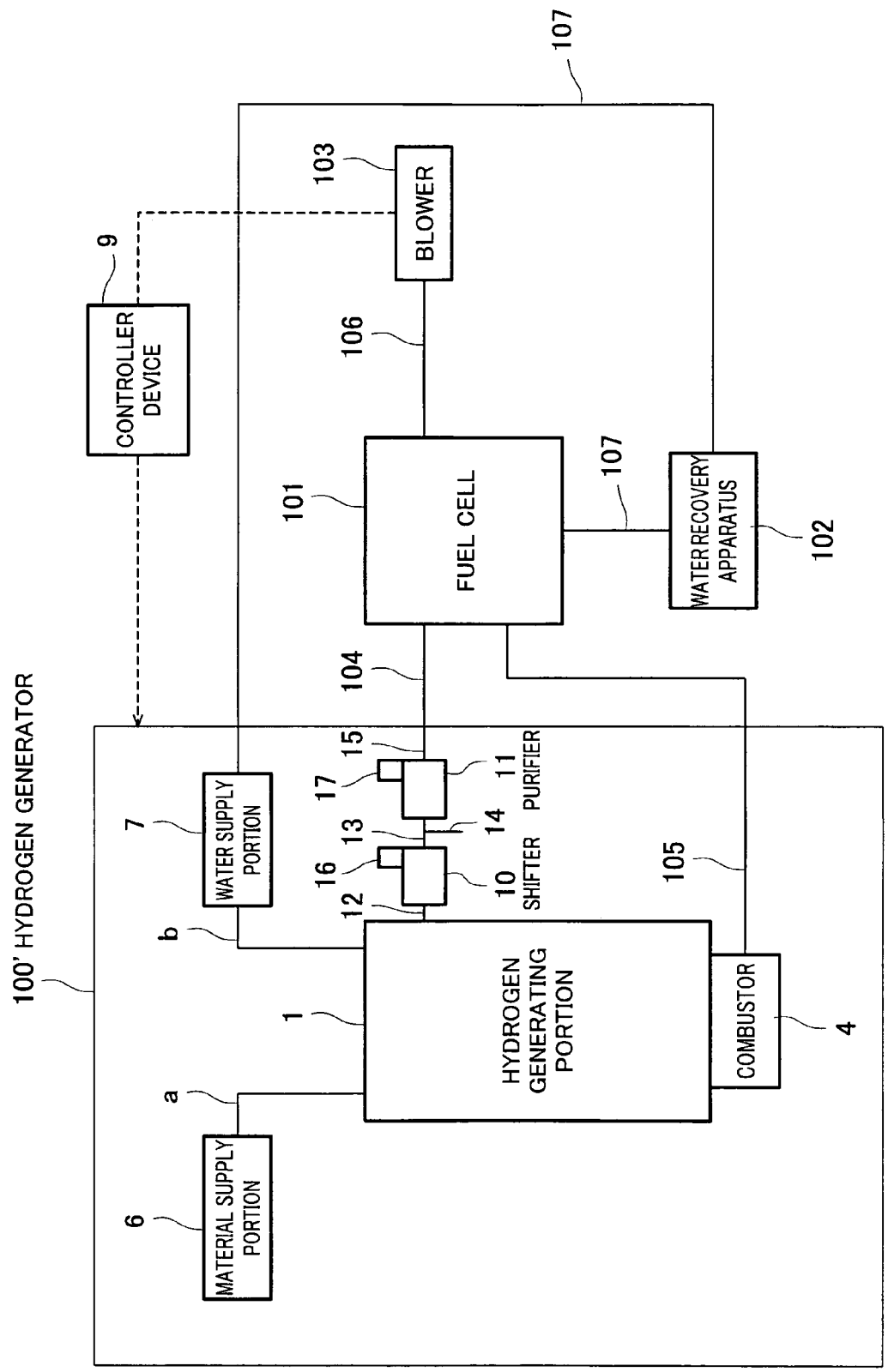
FIG. 11 is a schematic block diagram illustrating the configuration of a fuel cell system according to Embodiment 5 of the present invention.

FIG. 11 is a schematic block diagram illustrating the configuration of a fuel cell system according to Embodiment 5 of the present invention. As shown in FIG. 11, the fuel cell system of the present embodiment comprises, as its major constituting components, a hydrogen generator 100' of Embodiment 3, a solid polymer electrolyte fuel cell (hereafter simply referred to as a "fuel cell") 101, a water recovery apparatus 102, a blower 103, and a controller 9. The controller 9 is configured to control the hydrogen generator 100', the fuel cell 101, the water recovery apparatus 102, and the blower 103. Herein, a control signal for stopping the fuel cell system is output to the controller 9 is defined as a start of a stop operation of the fuel cell system, and the condition in which the operations of all the constituting components 100', 101, 102, and 103 are stopped is defined as a stop of the fuel cell system. The start of the stop operation of the fuel cell system corresponds to the start of the stop operation of the hydrogen generator 100'.

The hydrogen generator 100' is connected to the fuel cell 101 through a power generation fuel pipe 104 and a fuel off gas pipe 105. The fuel cell 101 is connected to the blower 103 through an air pipe 106 and is connected to the water recovery apparatus 102 through a water recovery pipe 107. This water recovery apparatus 102 is further connected to the water supply portion 7 of the hydrogen generator 100' through the water recovery pipe 107.

In operating the fuel cell system, hydrogen gas is first generated by the hydrogen generator 100'. The generated hydrogen gas is supplied as a power generation fuel to the anode side of the fuel cell 101 through the power generation fuel pipe 104. On the other hand, to the cathode side of the fuel cell 101, air is supplied from the blower 103 through the air pipe 106. The fuel cell 101 generates electric power through the reaction of the hydrogen gas and the air supplied (hereafter referred to as "power generation reaction") and generates heat accompanied by this power generation reaction. Although not shown in the figure here, the electric energy obtained by the fuel cell 101 is supplied to a power load terminal and consumed for various uses, while the thermal energy generated accompanying the power generation reaction is recovered by a heat recovery means, supplied to a heat load terminal, and utilized for various uses. As the heat recovery means, a hot water recovery apparatus or the like is used.

The water produced through the power generation reaction in the fuel cell 101 is collected by the water recovery apparatus 102 through the water recovery pipe 107, and a portion or the whole thereof is further sent to the water supply portion 7 of the hydrogen generator 100' through the water recovery apparatus 107. Meanwhile, the unused hydrogen gas (also known as "off gas") that has not been utilized for the power generation reaction is taken out from the fuel cell 101 and is supplied as a combustion fuel to the combustor 4 of the hydrogen generator 100' through the fuel off gas pipe 105.

The fuel cell system of the present embodiment can produce hydrogen gas efficiently and stably in the hydrogen generator 100' and thus makes is possible to supply hydrogen gas to the fuel cell 101 stably. Therefore, stable generation of electric power energy and thermal energy is possible in the fuel cell 101, and it is possible to realize a cogeneration system that achieves good energy saving performance and economic efficiency.

Embodiment 6

Figure 12:
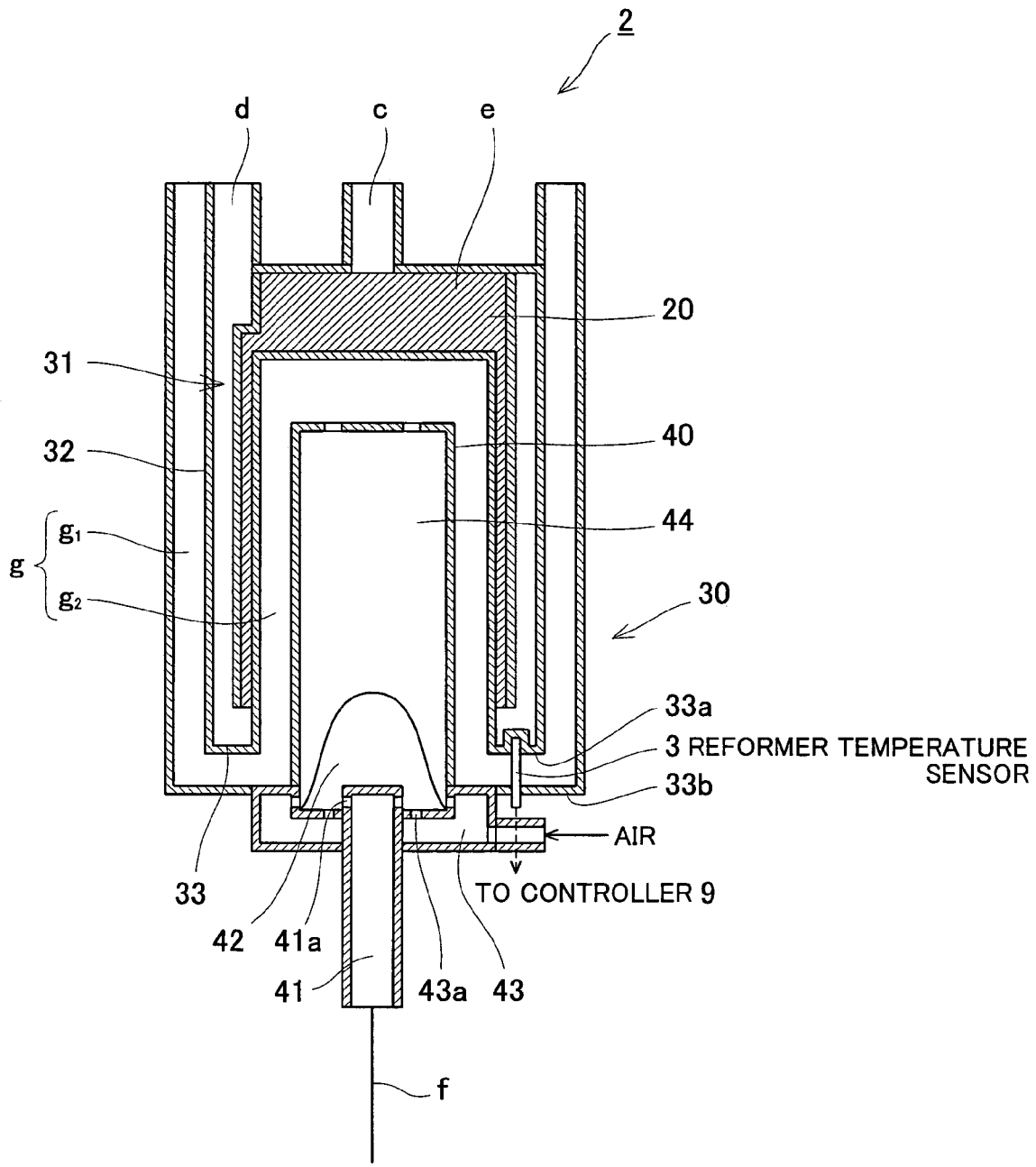
FIG. 12 is a schematic cross-sectional view illustrating the configuration of a primary portion of a reformer of a hydrogen generator according to Embodiment 6 of the present invention.
Figure 13:
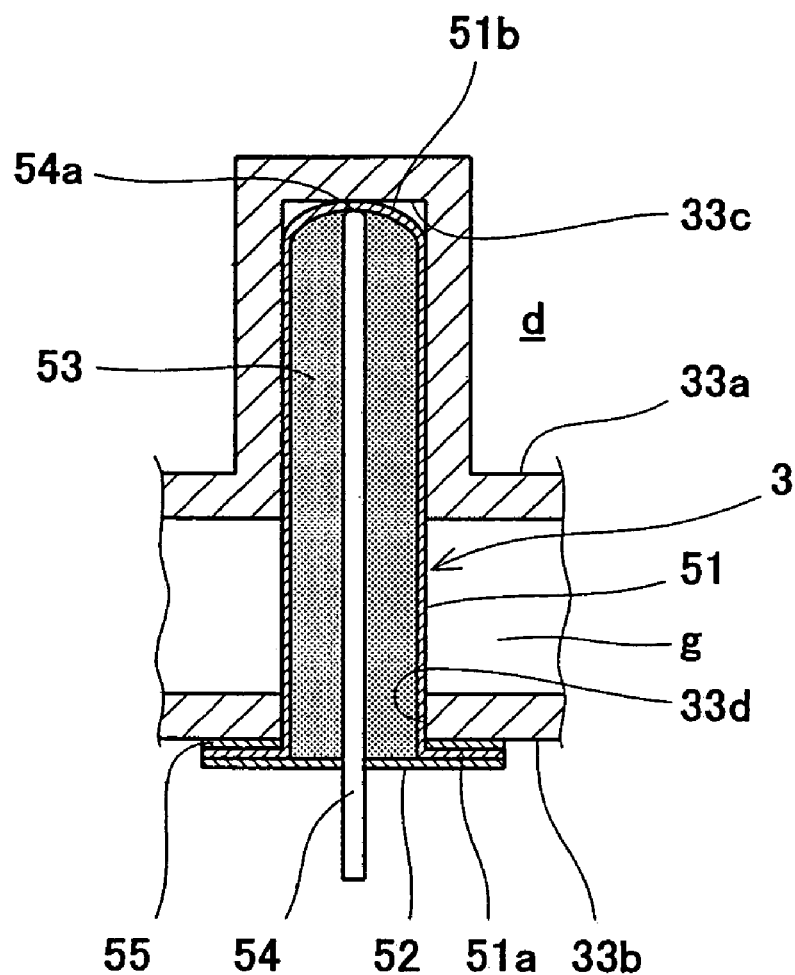
FIG. 13 is a partially-enlarged cross-sectional view in which the reformer temperature sensor of FIG. 12 is shown enlarged.

FIG. 12 is a schematic cross-sectional view illustrating the configuration of a primary portion of a reformer of a hydrogen generator according to Embodiment 6 of the present invention, and FIG. 13 is a partially-enlarged cross-sectional view in which the reformer temperature sensor of FIG. 12 is shown enlarged. In FIGS. 12 and 13, same reference characters denote same or corresponding parts.

As shown in FIGS. 12 and 13, in the present embodiment, the reformer temperature sensor 3 is configured to detect the temperature of the reformer 2 through a partition wall (horizontal wall) 33a between the reformed gas passage d and the combusted gas passage g. In addition, the hydrogen generator 100 is configured so that, at its stop, the reformed gas in the reformed gas passage d is purged with steam and after that, the reformed gas passage d is purged with a city gas 13A. In other respects, this embodiment is similar to Embodiment 1.

Specifically, as shown in FIG. 13, the partition wall 33a between the reformed gas passage d and the combusted gas passage g has a cylindrical recessed portion 33c, which is recessed when viewed from the combusted gas passage g side and protrudes toward the reformed gas passage d. In addition, an outer wall (horizontal wall) 33b of the combusted gas passage has a through hole 33d formed at a portion opposing the recessed portion 33c.

Meanwhile, the reformer temperature sensor 3 has a cylindrical sheath tube 51 one end of which is open and the other end of which is closed. At the one end of the sheath tube 51 that is open (hereafter referred to as an "open end"), a flange 51a is formed. Into the sheath tube 51, a thermocouple 54 is inserted so that its fore-end 54a is into contact with a bottom portion 51b of the sheath tube 51. Furthermore, powdery caulking material 53 is filled into the sheath tube 51 so as to fill the space between the thermocouple 54 and the tube wall. The caulking material 53 is for preventing the thermocouple from moving and is composed of a thermally conductive and electrically insulative material, such as magnesium oxide ($MgO_2$). The open end of the sheath tube 51 is sealed by a lid plate 52 that fits onto the flange 51a. The lid plate 52 is joined to the flange 51a of the sheath tube 51 by an appropriate means, such as welding. The lid plate 52 has a through hole, through which the thermocouple 54 extends to an outside of the sheath tube 51.

This sheath tube 51 of the reformer temperature sensor 3 is inserted to fit into the recessed portion 33c of the partition wall 33a, with its bottom portion 51b being the fore-end (being directed upward) through the through hole 33d in the outer wall 33b of the combusted gas passage g. The bottom portion 51b (fore-end portion) of the sheath tube 51 is in contact with the bottom portion (partition wall 33a) of the recessed portion 33c. The sheath tube 51 is fixed to the outer wall 33b of the combusted gas passage g by fixing the flange 51a to the outer wall 33b with an appropriate fixture such as a screw. The flange 51a is fixed to the outer wall 33 so as to sandwich a gasket 55 between the flange 51a and the outer wall 33b of the combusted gas passage g, whereby the combusted gas passage g is sealed with respect to the outside.

The sheath tube 51 and the lid member 52 are composed of a material that has heat conducting characteristics, corrosion resistance, and heat resistance. These characteristics are basically required for the materials for temperature gauging devices used in a corrosive atmosphere. Furthermore, the sheath tube 51 and the lid member 52 has, as a component that characterizes the present invention, an oxide film, formed on their surfaces, that functions as a protective film against corrosion in an oxidizing atmosphere. Specifically, in the present embodiment, the sheath tube 51 and the lid member 52 are formed by stainless steel, and an oxide film of the stainless steel is formed on their surfaces in an oxidizing atmosphere.

Next, the operation of the reformer temperature sensor 3 thus configured will be described.

Referring to FIGS. 2 and 13, for example, if it is assumed that the sheath tube 51 of the reformer temperature sensor 3 of the present embodiment is attached to the partition wall (vertical wall) between the reformed gas passage d and the combusted gas passage g so as to pierce through the partition wall 33 in the same manner as in Embodiment 1 (see FIG. 2), the sheath tube 51 will be in the reformed gas passage d. In the present embodiment, as the hydrogen generator stops, the reformed gas passage d results in an oxidizing atmosphere by allowing the reformed gas passage d to be purged with steam. In this case, an oxide film forms on the surface of the sheath tube 51. On the other hand, while the hydrogen generator is being operated, the reformed gas passage d is filled with a hydrogen-rich gas. Thus, the reformed gas passage d results in a reducing atmosphere, and the oxide film on the surface of the sheath tube 51 is reduced, turning into iron (not stainless steel). When the reformed gas passage d becomes an oxidizing atmosphere at the next stop of the hydrogen generator, the iron oxidizes, turning into so-called iron mold, by which the sheath tube 51 is corroded. Because of the repetition of such oxidization and reduction of the sheath tube 51, which is accompanied by the repetition of the operation and stop of the hydrogen generator, the corrosion proceeds.

In contrast, in the present embodiment, the sheath tube 51 is positioned in the combusted gas passage g. The combusted gas passage g results in an oxidizing atmosphere by an intrusion of air when the hydrogen generator stops. On the other hand, when the hydrogen generator is operated, a combusted gas fills therein, and this combusted gas contains the air that was supplied for combusting fuel gas and has not been consumed for combusting the fuel gas; therefore, the combusted gas passage g results in an oxidizing atmosphere. In other words, the combusted gas passage g is of an oxidizing atmosphere at all times. Accordingly, even when the hydrogen generator repeats the operation and stop, it is possible to prevent the corrosion caused by the above-described mechanism. It should be noted that the reformer temperature sensor 3 can detect the temperature of the reformer 2 accurately since the fore-end (bottom portion) 51b of the sheath tube 51 is in contact with the partition wall 33a (more precisely, the recessed portion 33c) that partitions the reformed gas passage d and the fore-end 54a of the thermocouple 54 is in contact with the fore-end 51b of the sheath tube 51. However, considering thermal expansion of the sheath tube 51 or the thermocouple 54, the sheath tube 51 may have a space with respect to the partition wall 33a or the thermocouple 54 may have a space with respect to the sheath tube 51, as long as the spaces are determined such that the temperature of the reformed gas passage d can be detected through the partition wall 33a. Further, the temperature detected by the thermocouple 54 may be corrected if necessary to detect the temperature of the reformed gas passage d through the partition wall 33a as described above, so that the temperature of the reformer 2 can be detected more accurately.

As explained above, the present embodiment can prevent corrosion of the reformer temperature sensor 3 having the sheath tube 51, on the surface of which an oxide film forms in an oxidizing atmosphere, which is caused by the repetition of the operation and stop of the hydrogen generator.

It should be noted that although Embodiments 1 though 5 describe that the temperatures of predetermined portions of a hydrogen generator, such as the reformer 2, are detected directly, they may be indirectly detected by, for example, detecting pressures or the like.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made in specific structures and/or functions substantially without departing from the scope and sprit of the invention.

What is claimed is:

1. A hydrogen generator comprising:
   a hydrogen generating portion having a reformer configured to generate a hydrogen-rich reformed gas by causing a material containing an organic compound comprised of at least carbon and hydrogen to react with steam with the use of a catalyst:
   a heater configured to heat at least said reformer;
   a material supply portion configured to supply the material to said hydrogen generating portion;
   a water supply portion configured to supply water that is evaporated into the steam to said hydrogen generating portion; and
   a controller configured to control at least said heater, said material supply portion, and said water supply portion;
   said controller being configured to stop heating in said heater at a start of a stop operation, and to perform an internal gas replacement operation to replace the hydrogen-rich gas within said hydrogen generator with a replacement gas in the stop operation by flowing the replacement gas through said hydrogen generator, wherein:
   in the internal gas replacement operation,
   the material supplied from said material supply portion, the steam generated from the water supplied from said water supply portion, air supplied from outside of said hydrogen generator, an inert gas supplied from outside of said hydrogen generator, or a gas mixture containing two or more of the material, the steam, the air, and the inert gas is used as said replacement gas;
   a composition of the replacement gas used according to a temperature condition of said hydrogen generator in the stop operation including at least the temperature of said reformer is pre-set in said controller; and
   said controller is configured to, in the stop operation, determine the temperature condition of said hydrogen generator, and to, in the stop operation, control said heater, said material supply portion, and said water supply portion so as to perform the operation to replace the hydrogen-rich gas using the replacement gas selected based on the determination and the pre-setting.

2. The hydrogen generator according to claim 1, further comprising a reformer temperature sensor configured to detect the temperature of said reformer, and wherein
   said controller is configured to determine, in the stop operation, the temperature condition of said hydrogen generator based on the temperature of said reformer detected by said reformer temperature sensor.

3. The hydrogen generator according to claim 2, wherein:
   in said controller, at least one reference temperature is pre-set, the reference temperature being a criterion for determining whether or not said reformer in the stop operation is in a condition in which water condensation of steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs; and
   said controller is configured to, at stop of an operation of said hydrogen generator, determine the temperature condition of said hydrogen generator by comparing the temperature of said reformer detected by said reformer temperature sensor with the reference temperature.

4. The hydrogen generator according to claim 2, further comprising a temperature sensor configured to detect a temperature of a predetermined portion other than said reformer, wherein said controller is configured to determine the temperature condition of said hydrogen generator taking into account the temperature of the predetermined portion detected by said temperature sensor in the stop operation.

5. The hydrogen generator according to claim 4, further comprising:
   a shifter configured to remove carbon monoxide from a hydrogen-rich gas;
   a purifier configured to selectively oxidize a shifted gas obtained from said shifter to further remove carbon monoxide therefrom;
   a shifter temperature sensor configured to detect a temperature of said shifter; and
   a purifier temperature sensor configured to detect a temperature of said purifier; and wherein
   said controller is configured to determine, based on the temperature of said shifter detected by said shifter temperature sensor and the temperature of said purifier detected by said purifier temperature sensor in the stop operation, whether or not, in the stop operation, said shifter and said purifier are in a condition in which water condensation of steam occurs, and said controller is configured to determine the temperature condition of said hydrogen generator based on the determination of the conditions of said shifter and said purifier and the determination of the temperature condition of said reformer.

6. The hydrogen generator according to claim 1, wherein said controller is configured to store an operating state of said hydrogen generator before the stop operation, and to estimate, in the stop operation, the temperature condition of said hydrogen generator in the stop operation from the stored operating state of said hydrogen generator.

7. The hydrogen generator according to claim 6, wherein:
said controller is configured to pre-store a correlation between durations of running operation and temperature conditions of said hydrogen generator, and said controller is configured to acquire a duration up to the start of the stop operation as the operating state of said hydrogen generator before the stop operation; and
said controller is configured to determine, from the acquired duration up to the start of the stop operation and based on the correlation pre-stored, whether or not said hydrogen generator in the stop operation is in a condition in which water condensation of steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs.

8. The hydrogen generator according to claim 3, wherein, in said controller, a first replacement gas setting is stored such that, when the temperature condition of said hydrogen generator in the stop operation is the condition in which water condensation occurs, the internal gas replacement operation is performed using one of the replacement gases which are other than the replacement gas consisting of the steam.

9. The hydrogen generator according to claim 3, wherein, in said controller, a second replacement gas setting is stored such that, when the temperature condition of said hydrogen generator in the stop operation is the condition in which the water condensation and the thermal decomposition of the material are avoidable, the internal gas replacement operation is performed with the material, the steam, the air, the inert gas, or the gas mixture containing two or more of the material, the steam, the air, and the inert gas.

10. The hydrogen generator according to claim 3, wherein, in said controller, a third replacement gas setting is stored such that, when the temperature condition of said hydrogen generator in the stop operation is the condition in which thermal decomposition of the material occurs, the internal gas replacement operation is performed using one of the replacement gases which are other than the replacement gas consisting of the material.

11. The hydrogen generator according to claim 3, wherein, in said controller, a fourth replacement gas setting is stored such that, when the temperature condition of said hydrogen generator in the stop operation is the condition in which the disproportionation reaction occurs, the internal gas replacement operation is performed using the replacement gas containing the steam.

12. The hydrogen generator according to claim 3, wherein, in said controller, a fifth replacement gas setting is stored such that, when the temperature condition of said hydrogen generator in the stop operation is the condition in which oxidization of the catalyst occurs, the internal gas replacement operation is performed using one of the replacement gases which are other than the replacement gas consisting of the air.

13. The hydrogen generator according to claim 8, wherein:
in said controller,
a first reference temperature, a second reference temperature, a third reference temperature, and a fourth reference temperature are pre-set, the first reference temperature being a determination criterion as to whether or not said reformer is in a condition in which water condensation of the steam occurs, the second reference temperature being a determination criterion as to whether or not said reformer is in a condition in which thermal decomposition of the material occurs and being higher than the first reference temperature, the third reference temperature being a determination criterion as to whether or not said reformer is in a condition in which the disproportionation reaction occurs and being higher than the second reference temperature, and the fourth reference temperature being a determination criterion as to whether or not said reformer is in a condition in which oxidization of the catalyst occurs and being higher than the third temperature; and
said controller is configured to perform the internal gas replacement operation in such a manner that:
if the temperature of said reformer detected in the stop operation is less than the first reference temperature, the material is used as the replacement gas based on the first replacement gas setting;
if the temperature of said reformer is equal to or higher than the first reference temperature and less than the second reference temperature, the material is used as the replacement gas based on the second replacement gas setting;
if the temperature of said reformer is equal to or higher than the second reference temperature and less than the third reference temperature, the steam is used as the replacement gas based on the third replacement gas setting;
if the temperature of said reformer is equal to or higher than the third reference temperature and less than the fourth reference temperature, a gas mixture that contains the material and the steam and has a S/C ratio, which is the ratio of water molecules S to carbon atoms C originating from the material, is 2 or greater, is used as the replacement gas based on the fourth replacement gas setting; and
if the temperature of said reformer is equal to or higher than the fourth reference temperature, a gas mixture of the material and the steam supplied in the same supply amounts as those in a hydrogen generation operation is used as the replacement gas based on the fifth replacement gas setting.

14. The hydrogen generator according to claim 8, wherein:
in said controller, a first reference time, a second reference time, a third reference time, and a fourth reference time are pre-set based on a correlation between the durations of the running operation and the temperatures of the reformer, the first reference time being a determination criterion as to whether or not said reformer being in the stop operation is in a condition in which water condensation of the steam occurs, the second reference time being a determination criterion as to whether or not said reformer is in a condition in which thermal decomposition of the material occurs and being longer than the first reference time, the third reference time being a determination criterion as to whether or not said reformer is in a condition in which the disproportionation reaction occurs and being longer than the second reference time, and the fourth reference time being a determination criterion as to whether or not said reformer is in a condition in which the oxidization of the catalyst occurs and being longer than the third reference time; and said controller is configured to perform the internal gas replacement operation in such a manner that:

if the duration of the operation is shorter than the first reference time, the material is used as the replacement gas based on the first replacement gas setting;

if the duration of the operation is equal to or longer than the first reference time and shorter than the second reference time, the material is used as the replacement gas based on the second replacement gas setting;

if the duration of the operation is equal to or longer than the second reference time and shorter than the third reference time, the steam is used as the replacement gas based on the third replacement gas setting;

if the duration of the operation is equal to or longer than the third reference time and shorter than the fourth reference time, a gas mixture that contains the material and the steam and has a S/C ratio, which is the ratio of water molecules S to carbon atoms C originating from the material, is 2 or greater, is used as the replacement gas based on the fourth replacement gas setting; and if the duration of the operation is equal to or longer than the fourth reference time, a gas mixture of the material and the steam supplied in the same supply amounts as those in a hydrogen generation operation is used as the replacement gas based on the fifth replacement gas setting.

15. The hydrogen generator according to claim 1, wherein, said controller is configured to control, in the internal gas replacement operation during the stop operation, the internal gas replacement operation according to a change in the temperature condition of said hydrogen generator associated with the stop operation.

16. The hydrogen generator according to claim 15, wherein said controller is configured to determine the temperature condition of said hydrogen generator during the stop operation, and to select an appropriate setting of the replacement gas according to the determination.

17. A fuel cell system comprising:
a hydrogen generator including:
a hydrogen generating portion having a reformer configured to generate a hydrogen-rich reformed gas by causing a material containing an organic compound comprised of at least carbon and hydrogen to react with steam with the use of a catalyst:
a heater configured to heat at least said reformer;
a material supply portion configured to supply the material to said hydrogen generating portion;
a water supply portion configured to supply water that is evaporated into the steam to said hydrogen generating portion; and
a controller configured to control at least said heater, said material supply portion, and said water supply portion;
said controller being configured to stop heating in said heater at a start of a stop operation, and to perform an internal gas replacement operation to replace the hydrogen-rich gas within said hydrogen generator with a replacement gas in the stop operation by flowing the replacement gas through said hydrogen generator, wherein:
in the operation to replace the hydrogen-rich gas,
the material supplied from said material supply portion, the steam generated from the water supplied from said water supply portion, air supplied from outside of said hydrogen generator, an inert gas supplied from outside of said hydrogen generator, or a gas mixture containing two or more of the material, the steam, the air, and the inert gas is used as said replacement gas;
a composition of the replacement gas used according to a temperature condition of said hydrogen generator in the stop operation including at least the temperature of said reformer is pre-set in said controller; and
said controller is configured to, in the stop operation, determine the temperature condition of said hydrogen generator, and to, in the stop operation, control said heater, said material supply portion, and said water supply portion so as to perform the internal gas replacement operation using the replacement gas selected based on the determination and the pre-setting; and
a fuel cell configured to be supplied with the hydrogen-rich gas generated by said hydrogen generator as a material and with oxygen as an oxidizing agent, and to generate heat and electricity by oxidization of the hydrogen-rich gas.

18. A method for controlling a hydrogen generator including a hydrogen generating portion having a reformer configured to generate a hydrogen-rich reformed gas by causing a material containing an organic compound comprised of at least carbon and hydrogen to react with steam with the use of a catalyst, a heater configured to heat at least said reformer, a material supply portion configured to supply the material to said hydrogen generating portion, a water supply portion configured to supply water that is evaporated into the steam to said hydrogen generating portion, and a controller configured to control at least said heater, said material supply portion, and said water supply portion;

said method comprising;

stopping heating in said heater at a start of a stop operation by said controller;

performing, by said controller, an internal gas replacement operation to replace the hydrogen-rich gas within said hydrogen generator with a replacement gas in the stop operation by flowing the replacement gas through said hydrogen generator; wherein in the internal gas replacement operation, the material supplied from said material supply portion, the steam generated from the water supplied from said water supply portion, air supplied from outside of said hydrogen generator, an inert gas supplied from outside of said hydrogen generator, or a gas mixture containing two or more of the material, the steam, the air, and the inert gas is used as said replacement gas;

a composition of the replacement gas used according to a temperature condition of said hydrogen generator in the stop operation including at least the temperature of said reformer is pre-set in said controller; and in the stop operation, said controller determines the temperature condition of said hydrogen generator, and controls said heater, said material supply portion, and said water supply portion so as to perform the operation to replace the hydrogen-rich gas using the replacement gas selected based on the determination and the pre-setting.

19. The method for controlling the hydrogen generator according to claim 18, wherein the hydrogen generator further comprises a reformer temperature sensor configured to detect the temperature of said reformer, and said controller determines, in the stop operation, the temperature condition of said hydrogen generator based on the temperature of said reformer detected by said reformer temperature sensor.

20. The method for controlling the hydrogen generator according to claim 19, wherein:
in said controller, at least one reference temperature is pre-set, the reference temperature being a criterion for determining whether or not said reformer in the stop operation is in a condition in which water condensation of steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs; and
at stop of an operation of said hydrogen generator, said controller determines the temperature condition of said hydrogen generator by comparing the temperature of said reformer detected by said reformer temperature sensor with the reference temperature.

21. The method for controlling the hydrogen generator according to claim 19, wherein the hydrogen generator further comprises a temperature sensor configured to detect a temperature of a predetermined portion other than said reformer, and said controller determines the temperature condition of said hydrogen generator taking into account the temperature of the predetermined portion detected by said temperature sensor in the stop operation.

22. The method for controlling the hydrogen generator according to claim 21, wherein the hydrogen generator further comprises:
a shifter configured to remove carbon monoxide from a hydrogen-rich gas;
a purifier configured to selectively oxidize a shifted gas obtained from said shifter to further remove carbon monoxide therefrom;
a shifter temperature sensor configured to detect a temperature of said shifter; and
a purifier temperature sensor configured to detect a temperature of said purifier; and wherein
based on the temperature of said shifter detected by said shifter temperature sensor and the temperature of said purifier detected by said purifier temperature sensor in the stop operation, said controller determines whether or not, in the stop operation, said shifter and said purifier are in a condition in which water condensation of steam occurs, and, based on the determination of the conditions of said shifter and said purifier and the determination of the temperature condition of said reformer, said controller determines the temperature condition of said hydrogen generator.

23. The method for controlling the hydrogen generator according to claim 18, wherein said controller stores an operating state of said hydrogen generator before the stop operation, and estimates, in the stop operation, the temperature condition of said hydrogen generator in the stop operation from the stored operating state of said hydrogen generator.

24. The method for controlling the hydrogen generator according to claim 23, wherein:
said controller pre-stores a correlation between durations of running operation and temperature conditions of said hydrogen generator, and said controller acquires a duration up to the start of the stop operation as the operating state of said hydrogen generator before the stop operation; and
said controller determines, from the acquired duration up to the start of the stop operation and based on the correlation pre-stored, whether or not said hydrogen generator in the stop operation is in a condition in which water condensation of steam occurs, whether or not it is in a condition in which thermal decomposition of the material occurs, whether or not it is in a condition in which disproportionation reaction of carbon monoxide and carbon dioxide occurs, or whether or not it is in a condition in which oxidization of the catalyst occurs.

25. The method for controlling the hydrogen generator according to claim 20, wherein, in said controller, a first replacement gas setting is stored such that, when the temperature condition of said hydrogen generator in the stop operation is the condition in which water condensation occurs, the internal gas replacement operation is performed using one of the replacement gases which are other than the replacement gas consisting of the steam.

26. The method for controlling the hydrogen generator according to claim 20, wherein, in said controller, a second replacement gas setting is stored such that, when the temperature condition of said hydrogen generator in the stop operation is the condition in which the water condensation and the thermal decomposition of the material are avoidable, the internal gas replacement operation is performed with the material, the steam, the air, the inert gas, or the gas mixture containing two or more of the material, the steam, the air, and the inert gas.

27. The method for controlling the hydrogen generator according to claim 20, wherein, in said controller, a third replacement gas setting is stored such that, when the temperature condition of said hydrogen generator in the stop operation is the condition in which thermal decomposition of the material occurs, the internal gas replacement operation is performed using one of the replacement gases which are other than the replacement gas consisting of the material.

28. The method for controlling the hydrogen generator according to claim 20, wherein, in said controller, a fourth replacement gas setting is stored such that, when the temperature condition of said hydrogen generator in the stop operation is the condition in which the disproportionation reaction occurs, the internal gas replacement operation is performed using the replacement gas containing the steam.

29. The method for controlling the hydrogen generator according to claim 20, wherein, in said controller, a fifth replacement gas setting is stored such that, when the temperature condition of said hydrogen generator in the stop operation is the condition in which oxidization of the catalyst occurs, the internal gas replacement operation is performed using one of the replacement gases which are other than the replacement gas consisting of the air.

30. The method for controlling the hydrogen generator according to claim 25, wherein:
in said controller,
a first reference temperature, a second reference temperature, a third reference temperature, and a fourth reference temperature are pre-set, the first reference temperature being a determination criterion as to whether or not said reformer is in a condition in which water condensation of the steam occurs, the second reference temperature being a determination criterion as to whether or not said reformer is in a condition in which thermal decomposition of the material occurs and being higher than the first reference temperature, the third reference temperature being a determination criterion as to whether or not said reformer is in a condition in which the disproportionation reaction occurs and being higher than the second reference temperature, and the fourth reference temperature being a determination criterion as to whether or not said reformer is in a condition in which oxidization of the catalyst occurs and being higher than the third temperature; and
said controller performs the internal gas replacement operation in such a manner that:

if the temperature of said reformer detected in the stop operation is less than the first reference temperature, the material is used as the replacement gas based on the first replacement gas setting;

if the temperature of said reformer is equal to or higher than the first reference temperature and less than the second reference temperature, the material is used as the replacement gas based on the second replacement gas setting;

if the temperature of said reformer is equal to or higher than the second reference temperature and less than the third reference temperature, the steam is used as the replacement gas based on the third replacement gas setting;

if the temperature of said reformer is equal to or higher than the third reference temperature and less than the fourth reference temperature, a gas mixture that contains the material and the steam and has a S/C ratio, which is the ratio of water molecules S to carbon atoms C originating from the material, is 2 or greater, is used as the replacement gas based on the fourth replacement gas setting; and if the temperature of said reformer is equal to or higher than the fourth reference temperature, a gas mixture of the material and the steam supplied in the same supply amounts as those in a hydrogen generation operation is used as the replacement gas based on the fifth replacement gas setting.

31. The method for controlling the hydrogen generator according to claim 25, wherein:

in said controller, a first reference time, a second reference time, a third reference time, and a fourth reference time are pre-set based on a correlation between the durations of the running operation and the temperatures of the reformer, the first reference time being a determination criterion as to whether or not said reformer being in the stop operation is in a condition in which water condensation of the steam occurs, the second reference time being a determination criterion as to whether or not said reformer is in a condition in which thermal decomposition of the material occurs and being longer than the first reference time, the third reference time being a determination criterion as to whether or not said reformer is in a condition in which the disproportionation reaction occurs and being longer than the second reference time, and the fourth reference time being a determination criterion as to whether or not said reformer is in a condition in which the oxidization of the catalyst occurs and being longer than the third reference time; and said hydrogen generator performs the internal gas replacement operation in such a manner that:

if the duration of the operation is shorter than the first reference time, the material is used as the replacement gas based on the first replacement gas setting;

if the duration of the operation is equal to or longer than the first reference time and shorter than the second reference time, the material is used as the replacement gas based on the second replacement gas setting;

if the duration of the operation is equal to or longer than the second reference time and shorter than the third reference time, the steam is used as the replacement gas based on the third replacement gas setting;

if the duration of the operation is equal to or longer than the third reference time and shorter than the fourth reference time, a gas mixture that contains the material and the steam and has a S/C ratio, which is the ratio of water molecules S to carbon atoms C originating from the material, is 2 or greater, is used as the replacement gas based on the fourth replacement gas setting; and if the duration of the operation is equal to or longer than the fourth reference time, a gas mixture of the material and the steam supplied in the same supply amounts as those in a hydrogen generation operation is used as the replacement gas based on the fifth replacement gas setting.

32. The method for controlling the hydrogen generator according to claim 18, wherein, in the internal gas replacement operation during the stop operation, said controller controls the internal gas replacement operation according to a change in the temperature condition of said hydrogen generator associated with the stop operation.

33. The method for controlling the hydrogen generator according to claim 32, wherein said controller determines the temperature condition of said hydrogen generator during the stop operation, and selects an appropriate setting of the replacement gas according to the determination.

34. A method for controlling a fuel cell system including a hydrogen generator and a fuel cell configured to be supplied with the hydrogen-rich gas generated by said hydrogen generator as a material and with oxygen as an oxidizing agent, and to generate heat and electricity by oxidization of the hydrogen-rich gas, wherein said hydrogen generator comprises a hydrogen generating portion having a reformer configured to generate a hydrogen-rich reformed gas by causing a material containing an organic compound comprised of at least carbon and hydrogen to react with steam with the use of a catalyst, a heater configured to heat at least said reformer, a material supply portion configured to supply the material to said hydrogen generating portion, a water supply portion configured to supply water that is evaporated into the steam to said hydrogen generating portion, and a controller configured to control at least said heater, said material supply portion, and said water supply portion;

a method for controlling said hydrogen generator comprises;

stopping heating in said heater at a start of a stop operation by said controller;

performing, by said controller, an internal gas replacement operation, to replace the hydrogen-rich gas within said hydrogen generator with a replacement gas in the stop operation by flowing the replacement gas through said hydrogen generator, wherein:

in the internal gas replacement operation, the material supplied from said material supply portion, the steam generated from the water supplied from said water supply portion, air supplied from outside of said hydrogen generator, an inert gas supplied from outside of said hydrogen generator, or a gas mixture containing two or more of the material, the steam, the air, and the inert gas is used as said replacement gas;

a composition of the replacement gas used according to a temperature condition of said hydrogen generator in the stop operation including at least the temperature of said reformer is pre-set in said controller; and in the stop operation, said controller determines the temperature condition of said hydrogen generator, and controls said heater, said material supply portion, and said water supply portion so as to perform the operation to replace the hydrogen-rich gas using the replacement gas selected based on the determination and the pre-setting.

* * * * *

UNITED STATES PATENT AND TRADEMARK OFFICE
CERTIFICATE OF CORRECTION

PATENT NO. : 7,419,518 B2
APPLICATION NO. : 11/039082
DATED : September 2, 2008
INVENTOR(S) : Kunihiro Ukai et al.

It is certified that error appears in the above-identified patent and that said Letters Patent is hereby corrected as shown below:

On the title page: Item (56), Foreign Patent Documents, reads:

FOREIGN PATENT DOCUMENTS:

EP    1 271 679  1/2003
EP    1 501 147  1/2005
EP    1 538 126  6/2005
JP    2000095504  4/2000
JP   2000290001  10/2000
JP    1 094 031  4/2001
JP    2002008701  1/2002
JP    2002093447  3/2002
JP    2002151124  5/2002
WO   02/090249  11/2002 and should read:

EP    1 271 679  1/2003
EP    1 501 147  1/2005
EP    1 538 126  6/2005
JP    2000095504  4/2000
JP   2000290001  10/2000
EP    1 094 031  4/2001
JP    2002008701  1/2002
JP    2002093447  3/2002
JP    2002151124  5/2002
WO   02/090249  11/2002

On the title page: Under Item (56) Other Publications is not included and should read:

OTHER PUBLICATIONS

European Search Report dated March 10, 2008 issued in a counterpart application, namely, EP Appln. No. 05001133.

UNITED STATES PATENT AND TRADEMARK OFFICE
CERTIFICATE OF CORRECTION

PATENT NO. : 7,419,518 B2
APPLICATION NO. : 11/039082
DATED : September 2, 2008
INVENTOR(S) : Kunihiro Ukai et al.

It is certified that error appears in the above-identified patent and that said Letters Patent is hereby corrected as shown below:

On the title page: Item (*) Notice reads:

Subject to any disclaimer, the term of this patent is extended or adjusted under 35 U.S.C. 154(b) by 494 days.

and should read:

Subject to any disclaimer, the term of this patent is extended or adjusted under 35 U.S.C. 154(b) by 542 days.

Signed and Sealed this

Eighteenth Day of August, 2009

David J. Kappos
*Director of the United States Patent and Trademark Office*